(12) United States Patent
Browne et al.

(10) Patent No.: US 9,004,241 B2
(45) Date of Patent: Apr. 14, 2015

(54) POWERED VEHICLE BRAKE COOLING SYSTEM

(71) Applicant: GM Global Technology Operations LLC, Detroit, MI (US)

(72) Inventors: Alan L. Browne, Grosse Pointe, MI (US); Tadge J. Juechter, Troy, MI (US); Nancy L. Johnson, Northville, MI (US); Paul W. Alexander, Ypsilanti, MI (US); Xiujie Gao, Troy, MI (US); Richard J. Skurkis, Lake Orion, MI (US); Kirk D. Bennion, Mount Clemens, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/799,016

(22) Filed: Mar. 13, 2013

(65) Prior Publication Data
US 2014/0262644 A1   Sep. 18, 2014

(51) Int. Cl.
*F16D 65/12* (2006.01)
*F16D 65/847* (2006.01)

(52) U.S. Cl.
CPC .................................. *F16D 65/847* (2013.01)

(58) Field of Classification Search
USPC ... 188/71.6, 264 A, 264 AA, 264 R, 218 XL; 60/527, 528; 123/41.56, 41.58, 41.59; 165/41, 44; 180/68.1, 68.2, 68.3; 296/208
See application file for complete search history.

(56) References Cited

U.S. PATENT DOCUMENTS

| | | | | |
|---|---|---|---|---|
| 4,653,788 A | * | 3/1987 | Di Giusto | 293/117 |
| 4,810,021 A | * | 3/1989 | Burst | 296/180.1 |
| 4,887,430 A | * | 12/1989 | Kroll et al. | 60/527 |
| 5,121,818 A | * | 6/1992 | McComic | 188/264 AA |
| 7,823,558 B2 | * | 11/2010 | Bellato et al. | 123/306 |
| 8,678,426 B1 | * | 3/2014 | Browne et al. | 280/727 |
| 2005/0000574 A1 | * | 1/2005 | MacGregor et al. | 137/625.3 |
| 2008/0100071 A1 | * | 5/2008 | Browne et al. | 292/341.17 |
| 2008/0133090 A1 | * | 6/2008 | Browne et al. | 701/49 |
| 2009/0173305 A1 | * | 7/2009 | Alexander et al. | 123/184.53 |
| 2012/0318476 A1 | * | 12/2012 | Begleiter et al. | 165/51 |
| 2013/0233658 A1 | * | 9/2013 | Carmassi et al. | 188/264 R |

FOREIGN PATENT DOCUMENTS

| | | | | | |
|---|---|---|---|---|---|
| EP | 1362732 A1 | * | 5/2003 | | B60K 11/08 |
| GB | 2269144 A | * | 2/1994 | | B60T 5/00 |
| GB | 2357477 A | * | 6/2001 | | B60T 5/00 |

OTHER PUBLICATIONS

Machine Translation of EP 1362732 (no date).*

* cited by examiner

*Primary Examiner* — Nicholas J Lane
(74) *Attorney, Agent, or Firm* — Reising Ethington P.C.

(57) ABSTRACT

An inlet, positioned to access the flow of air passing around and under a moving vehicle, may draw in air which is conveyed through a duct and discharged to cool a brake on a vehicle. The inlet has a closure. The closure is opened and closed on demand by a temperature-operated actuator incorporating an active or smart material under the direction of a controller. In embodiments, a sensor, suitably positioned to sense a temperature representative of the brake temperature, communicates the sensed brake temperature to the controller. The controller may respond to the sensed brake temperature, by triggering operation of the actuator. Typically the closure is opened to allow passage of cooling air to the brake when the sensed brake temperature exceeds, or is anticipated to exceed, a predetermined temperature.

27 Claims, 11 Drawing Sheets

POWERED VEHICLE BRAKE COOLING SYSTEM

TECHNICAL FIELD

This disclosure pertains to a duct system with a powered closure for directing ambient air, on demand, to brakes on the wheels of the vehicle. More specifically, at least one actuator incorporating a reversible temperature sensitive active material, a controller and a sensor, cooperatively act to open and close the closure in the airflow duct system to provide cooling air, taken from the air flow around the moving automotive vehicle, to the vehicle brakes. The cooling air is provided, as needed, to maintain the brake temperature in a preferred operating range.

BACKGROUND OF THE INVENTION

Modern automotive vehicles typically have hydraulically actuated brakes on both the front and rear wheels of the vehicle. In vehicle disc brake systems, the hub of the vehicle wheel is mounted to an axially concentric, circular disc formed of a thermally conductive and wear resistant metal. A brake caliper, fixed to the vehicle, fits around a sector of the circular disc. When a vehicle operator steps on the brake pedal, hydraulic fluid is pressurized in a brake hose connected to the brake caliper and forces friction material pads of the brake caliper against both sides of the rotating wheel disc. The frictional engagement between the caliper pads and the rotating disc serves to slow, and under continued application, stop, the vehicle wheel. In drum brake systems, the vehicle wheel has an axially concentric, circular metal drum surface of thermally conductive and wear resistant metal. When braking is called for, pressurized hydraulic fluid in a brake hose forces arcuate brake linings of suitable friction material outwardly against the wheel drum, to again slow, and under continued application stop, the vehicle wheel.

For styling, and to control the dispersion of sand, mud, liquids, and other road spray picked up by the rotating tire, vehicle wheels are generally partially enclosed in a wheel well within the vehicle body. The wheel well is a generally circular, partially closed cavity originating at a vehicle fender or quarter panel and extending part-way into the vehicle body. The wheel well is open at its underside and at a vehicle fender or quarter panel but will generally be closed at the vehicle interior and around an appreciable portion of the tire circumference. Contained within the wheel well will be the wheel, brake assembly and, often, some suspension components such as springs and shock absorbers. The wheel well is sized to accommodate the wheel and tire in all configurations which they may adopt and so its design admits of the expected range of tire movements. These may include the suspension travel and, for the front wheels, the expected range of angular inclinations on turning the steering wheel.

Generally air flow around a moving vehicle contributes significantly to the cooling of brake disc and brake drum surfaces when they are heated by the repeated wheel braking actions of normal driving. This airflow is usually more than sufficient to cool brake discs, drums, and friction materials under most commonly-experienced driving conditions, although some extra operator care might be required when towing a trailer or when driving in mountainous regions with long, steep grades. However, vehicle hood, roof, rear deck, and side surfaces are being designed with greater emphasis on reducing vehicle drag. Of course, some air flow is admitted under hood and into the engine compartment for air flow through the radiator for engine cooling. This air may also cool the front wheel brakes as it flows out of the engine compartment and under the moving vehicle. But, an appreciable portion, of the drag experienced by a vehicle may arise from the air flowing under the floor of the vehicle passenger compartment and interacting with the moving wheels. In many vehicles this may contribute up to about 30% or more of the total drag. Hence, more attention has been paid to smoothing underfloor air flow and minimizing interaction of the airflow with the wheels. Many vehicles are fitted with an air dam or air flow director below the front bumper for directing air flow under a moving vehicle. This improved underfloor air flow and redirection of airflow from the wheels sometimes reduces the flow of cooling air against frictionally heated brake member surfaces.

There is therefore a need in some vehicle applications for a vehicle brake cooling system which is compatible with vehicle designs which promote a low vehicle drag coefficient.

SUMMARY OF THE INVENTION

This invention provides a duct system for intercepting and directing a flow of ambient cooling air to the brake systems on the front wheels (at least) of a vehicle. Such a vehicle may be a three-wheeled car or three-wheeler, an automobile, a light-, medium- or heavy-duty truck or a bus. The invention may be adapted for application to a trailer. A duct inlet member is placed on the vehicle body to intercept and receive air flowing over or under the moving vehicle, but the duct system is closed to air flow until supplemental brake cooling is required and signaled. A valve, or closure, in the duct system is opened, and the duct used to carry a stream of cooling air for directed release against a brake member frictionally heated while slowing a vehicle wheel.

In accordance with embodiments of this invention, a suitable active material which undergoes a heat-induced phase change is utilized as the direct actuating member of a mechanism that opens and closes the valve in the air-flow duct. The temperature of the brake member is monitored during vehicle operation by a suitable sensor which signals a controller to actuate an electrical current source when supplemental brake cooling is wanted. Electric heating, using vehicle battery power, is used to trigger the active material actuator and initiate the heat-induced phase change. Suitable phase change materials may include shape memory alloys (SMAs) and paraffin actuators. The motion produced by the phase change in the active material is used to open the valve in the air duct. A complementary reversal mechanism is employed to close the air duct when supplemental brake cooling is no longer required. Thus, the actuator, controller and sensor cooperate to open and close the closure in the airflow duct system to provide the supplementary cooling air only as needed. In many applications the closure may be adapted for on-off control, that is, the closure is intended to be either closed, and deny passage of cooling air or, open, and allow maximum flow of cooling air. But, in some embodiments, the closure may admit of proportional control so that it may permit a graduated flow of cooling air.

The duct member has an inlet located for receiving flowing air at a pressure sufficient for transport of the air stream to the wheel and its disc brake system, or other brake system. The cross-sectional area of the duct is sized along its length to accommodate the flow of ambient cooling air. The outlet of the air flow duct is located in a wheel well and preferably directs the flow of air against a heated surface of the brake member. If required, the duct may have a plurality of outlets so that cooling air may be directed against, or proximate to, a like plurality of brake locations. In many embodiments of the invention, the duct may be an extruded or molded tube-like structure of suitable polymer composition.

The inlet of the duct will generally be placed and attached at a location where there is an appreciable air flow around the moving vehicle. An example of one such location is at an air dam directing air flow under the engine compartment and passenger compartment floor. At such a duct inlet location, an open duct and inlet may have an adverse effect on the local streamlined air flow. Accordingly, the inlet or the duct will be closed by the closure member when brake cooling is not required. The closure may be positioned and adapted to cooperate with the inlet and/or duct to promote streamlined flow around the inlet. In many embodiments when no power is provided to the actuator the closure may be in its closed configuration and the vehicle in its aerodynamically clean configuration. However, in some embodiments it may be preferred to have the closure adopt its open configuration under power-off conditions to ensure that the supplementary brake cooling can never be lost.

As noted, the opening and closing of the closure is effected by an actuator incorporating an active material which undergoes a reversible phase change at a predetermined temperature or over a predetermined narrow temperature range. Commonly the heat will be generated electrically by provision of a portion of the on-vehicle battery power. In some embodiments, an external heater, such as a cartridge heater or a thermoelectric device, in thermal communication with the actuator may be used. A thermoelectric device, by reversal of the current flow may also be used for cooling to facilitate the reverse transformation. In SMA-based actuators current may be directed along the length of the electrically-conductive SMA element to generate Joule heating in the element. It will be appreciated that such Joule heating may quickly raise the element to its operating temperature and enable rapid actuator response.

The sensor may be placed in suitable heat transfer relationship with a disc caliper or other brake member so that it may sense the brake temperature. The sensor is in communication with a controller which may enable a closed closure to open, or, an open closure to close. By providing cooling air, as required, the temperature of the wheel brake system may be maintained below a predetermined temperature and preferably in a preferred range. The sensor and controller may be in continual communication or the sensor may communicate with the controller on some predetermined schedule, typically with a frequency of 0.1 to 1 Hz.

A suitable shape memory metal alloy, a suitable hydrocarbon paraffin composition, or the like, is chosen to experience a suitable shape change for actuating the opening of the duct inlet. The shape change or other transformation of the temperature sensitive active material on heating to its operating temperature serves to open the closure, enabling flow of cooling air. On cooling to below its operating temperature, the phase change is reversed and the phase change material may be restored to its original low temperature configuration, either spontaneously, or, more commonly, under the urging of a biasing force. The biasing force, often applied by a spring or a dead weight, in addition to re-establishing the low temperature configuration of the phase change material, may close the closure to shut off flow of cooling air. Thus both the closure and actuator are restored to a condition in which they may again operate to provide supplementary cooling air when called upon to do so.

In an embodiment in which the actuator is positioned close to the closure, generally on the duct itself, the actuator may operate the closure directly. In another embodiment, more tolerant of packaging considerations, the actuator may be positioned at a location distant from the closure and operate the closure through a linkage or cable. A brake cooling duct system, as described, is preferably used at least on each of the front wheel brakes and may also be used with the rear wheel brakes.

The closure, suitable for substantially on-off operation, may be one of a butterfly valve, a gate valve, a ball valve, a louver valve, an iris valve and a plug valve among others. For proportional control the valves may be adapted to permit partial airflow. For example, the louver valve may be adapted so that each of its louvers is independently operable. The closure may be located in the inlet or the duct. Provided the closure provides good sealing with minimal leakage to prevent flow of cooling air when closed, placement of the closure is not critical. But it is generally preferred to position the closure no more than a distance corresponding to about 30% of the duct length from the inlet.

In preferred embodiments of the invention, cooling air flows, when required, through an inlet and is conveyed, through a suitable duct, to the wheel well. The cooling air may be drawn from the exterior of the vehicle, preferably from regions of increased air pressure, or from the engine compartment. The cooling air flow may be discharged into the wheel well for general cooling of the brake, or, more preferably, directed through a suitable number of outlets against one or more specific heated brake surfaces. In the case of a disc brake, the cooling air may be directed at least against the rotor surface or, when vented rotors are used, to the inner diameter of the inner rotor surface. For a drum brake the cooling air may be directed at one or more locations on the drum. The opening cross-sectional area of the inlet may vary depending on the application and vehicle design, but, in many applications, may be about 12000 mm$^2$ or less in cross-sectional area per brake cooled.

The brake temperature, that is the drum, rotor or friction material temperature may be sensed directly, but in general, the brake temperature will rather be inferred from temperatures sensed at other, preferably non-rotating, locations on, or in, the brake system. These locations may include, in a disc brake system, the brake caliper, and in a drum brake, the backing plate. In both brake systems the temperature of the brake fluid may also be used as an indicator of brake temperature.

The cooling air may be drawn from any suitable location on the vehicle body which may include, without limitation, body panels, the hood, the cowl region, lower front fascia including splitter region and air dam, rear fascia, the roof, bumpers, chassis, frame and sub-frame components, pillars, and the like. Preferably the air originates in a zone of higher pressure so that a pressure gradient may be established to naturally urge the cooling air to the brake without need for pumps or other air-handling systems. Suitable high pressure locations may be located: in the radiator airflow, either ahead of the radiator or behind the radiator in the engine compartment; in the stagnant zone between a front air dam and the vehicle body; and at the base of the windshield, among others. In an exemplary embodiment a suitable high pressure location may be identified close to the brake to be cooled to enable use of shorter ducts of say, about 700 millimeters in length or less. However, it will be appreciated that the duct geometry and dimensions may vary considerably from vehicle to vehicle due to design and packaging constraints.

Shape memory alloys undergo a shape change as they metallurgically transform from one crystal structure to another when heated to a first temperature. The shape change may be undone or reversed, substantially completely, by cooling the shape-changed SMA to a second, lower temperature while under the influence of a biasing force, frequently applied by a spring.

The temperatures at which SMAs transform may be adjusted over a range of temperatures ranging from −100° C. or so up to about 300° C. by choice of alloy system and alloy composition. So an SMA may be selected which undergoes its shape change at any suitable preselected temperature within this range. For rapid response, with minimal heating, the SMA transformation temperature should fall within the lower range of available transformation temperatures. However, the selected temperature should be sufficiently high to avoid unintended opening of the closure under extremely high ambient temperatures of 40° C. to 50° C. or so. Generally, a selected operating temperature in the range of from about 80° C. to 200° C. is suitable, with lower temperatures offering more rapid opening of the closure and the higher temperatures promoting more rapid closing of the closure. On heating to its operating temperature, the shape change of the SMA will induce a displacement in the SMA. When the displacement is communicated to the closure, either directly, or by a linkage or cable, the closure will open, enabling cooling air to pass into ductwork where it may be conveyed to the brake assembly and there discharged to cool the brake. When the sensed brake temperature decreases to less than the predetermined brake temperature, the controller may discontinue heating the SMA so that the SMA may cool and transform to its martensite phase. Once in its martensite phase, the SMA may be deformed, usually by a spring, to undo the shape change and so close the inlet to re-adopt a lower drag configuration. In these embodiments the closure will remain open, and provide cooling air flow to the brake, only as long as the SMA is maintained in its elevated temperature phase. Hence electrical power must be continually expended to heat the active material at all times when the closure is open. No power need be applied to maintain the closure in its closed configuration.

In another embodiment, an SMA actuator may incorporate two SMA elements, arranged in opposition, with a latching mechanism so arranged that the actuator may hold the closure in either of its closed or open positions without continuous application of power. In such an actuator, power need be applied only for sufficient time to transition the actuator from one state to another and latch it into position, generally a few seconds, no matter how long the closure remains open or closed. In this embodiment, SMAs with a smaller transformation temperature range of between 80° C. and 100° C. may be preferred.

A paraffin actuator may undergo repeated melting and solidification of the paraffin wax to enable repeated inlet openings and closings. Paraffin undergoes a significant volume change of up to 40% on melting and, if confined in an otherwise closed container with a moveable plunger, may displace the plunger on melting and so serve as an actuator. Reversibility is achieved by cooling the paraffin, often while applying a return load to the plunger using, for example, a spring. The operating temperature of the paraffin actuator may be adjusted by controlling the carbon number(s) of the chosen paraffin or paraffin mixture. As with the above SMA-based actuators, a suitable operating temperature range may be between about 80° C. and 100° C.

Both an SMA and a paraffin actuator may exhibit some hysteresis, that is, the forward transformation, which opens the closure, will occur at a higher temperature than the reverse transformation. This hysteresis may preclude use of actuators with an operating temperature, on heating, of less than about 80° C. to avoid a lengthy closure period under high or extreme ambient temperatures in the range of 40° C. to 50° C.

Both SMA and paraffin actuators operate quasi-linearly so that the inlet will open and close progressively as the actuators cycle between their fully retracted and fully extended positions. The rate of opening may be controlled by adjustment of the power applied to achieve a targeted heating rate but unless thermoelectric heating/cooling devices are employed cooling will generally be by convection and conduction. Rapid cooling of the actuator and prompt closing of the closure may be promoted by exposing the actuator to the cooling air flow.

BRIEF DESCRIPTION OF THE DRAWINGS

FIG. 2A shows the complementary, passenger side duct and inlet of FIG. 1C in greater detail when viewed looking from the exterior of the vehicle. In FIG. 2B, the inlet and duct of FIG. 1C are shown in car position with a portion of the wheel, tire and brake assembly and body structure to illustrate its placement in a vehicle and relation to other vehicle components. The viewing direction is the same as that of FIG. 1C.

FIG. 2C shows the configuration of FIG. 2B when viewed from the vehicle exterior. FIG. 2D shows inlet 12e when viewed along the direction indicated by arrow 11 in FIGS. 2B and 2C. FIG. 2E illustrates an exemplary closure adapted to enable a range of airflows.

In FIG. 5B the closure is shown in its closed configuration. In FIG. 5C the closure is shown in its open position.

FIG. 6A shows the SMA actuator in cross-section. FIG. 6B shows the actuator and a representative heater and control circuit as it may appear in service.

FIG. 7A shows the actuator in a first 'power-on' configuration; FIG. 7B shows the actuator in a 'power-off' configuration; and FIG. 7C shows the actuator in a second 'power-on' configuration.

DESCRIPTION OF PREFERRED EMBODIMENTS

Figure 1A:
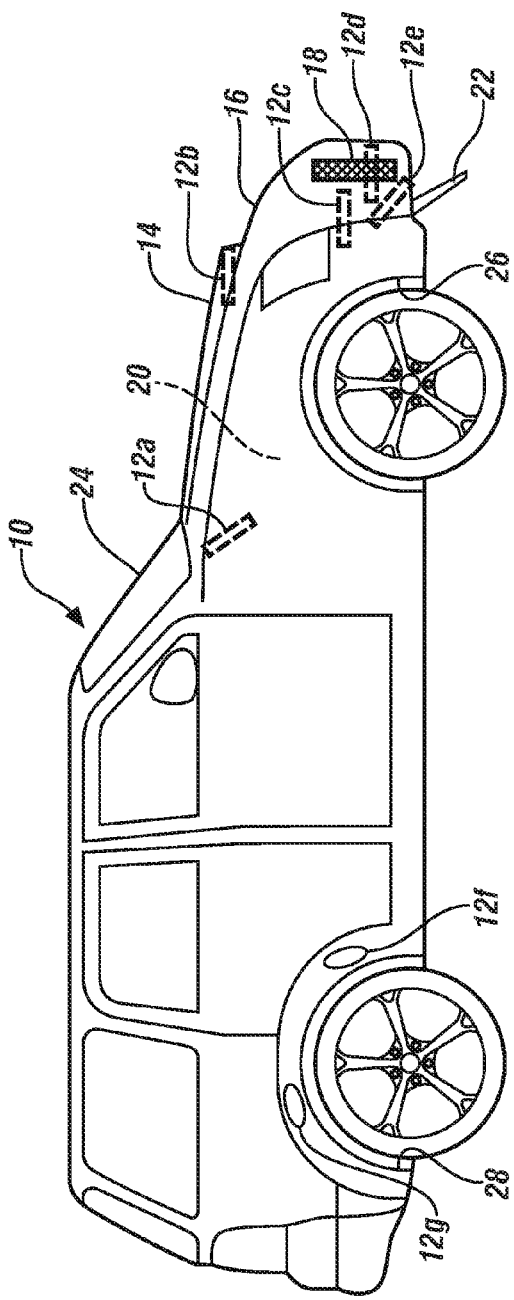
FIGS. 1A and 1B show, in side and front view respectively, a representation of a vehicle illustrating some suitable placements for brake cooling inlets.

A method of providing supplementary cooling air to the brakes of a vehicle, when needed, is described. Typically this need will arise when the brakes attain and exceed a predetermined elevated temperature, but other, more anticipatory, strategies may also be used. These could include consideration of the time-derivative of brake temperature rise, or consideration of prior experience on a frequently-travelled route or even knowledge of, for example mountainous, terrain gleaned from an on-board GPS unit and suitable mapping software In the most readily implemented embodiment, a temperature sensor, in communication with a controller, senses the brake temperature and, when the sensed brake temperature exceeds a predetermined limit, the controller acts to enable a flow of cooling air to the brakes.

Manual implementation is also possible. An operator-selectable switch might be used to select or deselect the cooling air. Where a vehicle provides the operator a choice of performance settings, such as 'economy', 'sporty' or similar the brake cooling setting may be coupled to the performance setting so that when the operator selects a particular performance setting, supplementary brake cooling will be turned on or turned off without need for further operator involvement.

The invention includes an inlet, located on the vehicle, and positioned to receive a portion of the air flow generated by vehicle motion. The inlet is connected to a duct which extends to at least one of the vehicle brakes and serves to convey the inlet air to the brake. The duct may have multiple branches to serve more than one brake and may terminate in one or more openings suitable for discharge of the inlet air in a manner which is effective in cooling the brake.

Because routing inlet air to the brakes is prejudicial to an aerodynamically 'clean' configuration and will increase vehicle drag, inlet air is applied to the brake only when the brake temperature may exceed its recommended operating range. Hence either the inlet or the duct may incorporate a closure, capable of closing off the inlet/duct to deny access to the inlet air. The closure is under the control of a controller which may operate an actuator to position the closure to either enable or deny access of air. The controller will adjust the closure position based on brake temperature measured with a sensor in communication with the controller. In one embodiment, the closure will operate in an on-off mode and the closure will adopt any of a plurality of intermediate 'partially-open' positions only briefly as the actuator cycles between its open and closed configurations. In another embodiment the closure may be adapted to adopt a range of configurations and enable proportional control of the closure to provide a graduated cooling air flow.

In many applications supplementary brake cooling will be required infrequently. Under this scenario the default, power-off, configuration may be to have the closure closed so that power need be applied on only those rare occasions when supplementary brake cooling is called for. This operating mode forms the basis for the operating description of the embodiments described in the following paragraphs. However, there may be scenarios, such as during racing or rallying, where supplementary brake cooling is required frequently. Under these conditions it may be more appropriate to have the brake closure default to 'open' and apply power to close it on those occasions when brake cooling is not required. It will be appreciated that the supplementary brake cooling system described below may be readily adapted to enable either operating scenario.

The inlet may be a shaped member mounted on the outer surface of the vehicle body. The inlet may be integral with the vehicle body, or secured to and supported by the vehicle body, or secured to a structural member underlying the vehicle body. The inlet may engage and serve to support the duct or the duct may be separately supported, typically on the vehicle structure. The inlet may be fabricated of a suitable polymeric material and secured to the vehicle by mechanical fasteners such as self-tapping screws, rivets, clips or other means well known to those skilled in the art. The inlet is intended to smoothly redirect some of the airflow around the vehicle body and prepare the airflow, with minimal disturbance, for entry into the duct which will convey it to a brake. The inlet may be molded and shaped to generally conform to the vehicle's exterior contours and may be color-matched to the vehicle paint to foster an aesthetically-pleasing appearance. In some embodiments the inlet may be integral with a molded vehicle body component such as a splitter or an air dam, including those which may be available as after-market accessories. In some embodiments, the inlet and duct may be formed as a unitary body.

The terminal end of the duct, that is, the end not attached to the inlet, is positioned to discharge the airflow where it may serve to cool a vehicle brake. The brake, its associated wheel, and generally, several suspension components will typically be partially enclosed in a wheel well, in most vehicles a wheel well is a generally semi-circular, partially open cavity extending inwardly from an opening in each of the vehicle body sides, but in some vehicles it may be closed on each side of the wheel. In some embodiments, the cooler airflow may be discharged generally into the wheel well, but preferably the duct outlet is advantageously positioned so that the outflowing cool air may be ported directly to the brakes to provide the most effective supplementary brake cooling. Where appropriate, the outflowing air may, by provision of multiple duct outlets, be directed on, or proximate to, multiple locations on a brake.

Figure 1B:
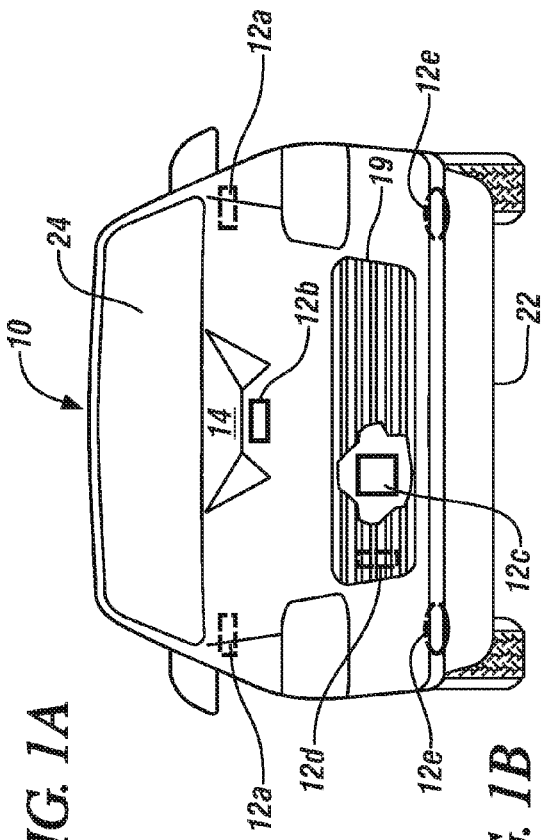

Air may be drawn into the duct from any convenient location on the vehicle body. In many vehicles, the wheel wells are subject to a reduced pressure so that cooling air drawn may be drawn from many body locations and 'sucked into' the wheel wells. It is preferred, to maximize flow and eliminate the need for an air pump, that the inlet be located in a region of the body where the air pressure is greater than the pressure which obtains in the wheel wells. As shown on vehicle 10 shown in FIGS. 1A and 1B, inlets 12*a-g* may be suitably located in a number of locations. Inlet 12*a* accepts ram air from the base of windshield 24. Inlet 12*b* accepts ram air from hood scoop 14 mounted in hood 16. Inlet 12*c* accepts air from engine compartment 20, which, although warmer than ambient air, is significantly cooler than the brake temperature. Inlet 12*d* is positioned within radiator opening 19 upstream of, or adjacent to, radiator 18. Inlet 12*e* is mounted on the body underside, upstream of air dam 22. Inlet 12*f* may be a scoop located forward of the rear wheel while inlet 12*g* may be positioned above the wheel in the rear fender. Each of the openings of inlets 12*a*-12*d* is shown as square or rectangular (FIG. 1B) while the openings of inlets 12*e* (FIG. 1B), 12*f* and 12*g* are depicted as round or oval (FIG. 1A). It will be appreciated that this is exemplary only and the inlet opening geometry may be of any shape compatible with its location on the vehicle body.

Ducting, not shown, may be used to connect any of inlets 12*a-g* to either or both of pairs of wheel wells 26, 28. It will be appreciated that in some vehicles, it may be appropriate to employ individual inlets and ducts for each brake while in other vehicles the flow from a single inlet may feed a single duct. In this case the captured air flow may be split and directed, via multiple ducts, to a like multiplicity of brakes. In car or light truck applications where all four brakes are cooled a combination of these approaches may also be used. Current design practice prefers that ducts not exceed about 700 millimeters in length and that inlet openings not exceed about 12000 mm$^2$ for each brake served. But ducts with other lengths and inlet areas may be employed depending based on cooling and packaging requirements. Generally the duct geometry (not shown) should conform to good practice. That is, the duct should minimize bends and changes in cross-sectional area and preferably have a smooth interior surface to minimize frictional losses. Where packaging constraints necessitate deviation from these guidelines any bends should be sweeping and changes in cross-sectional area gradual.

Figure 1C:
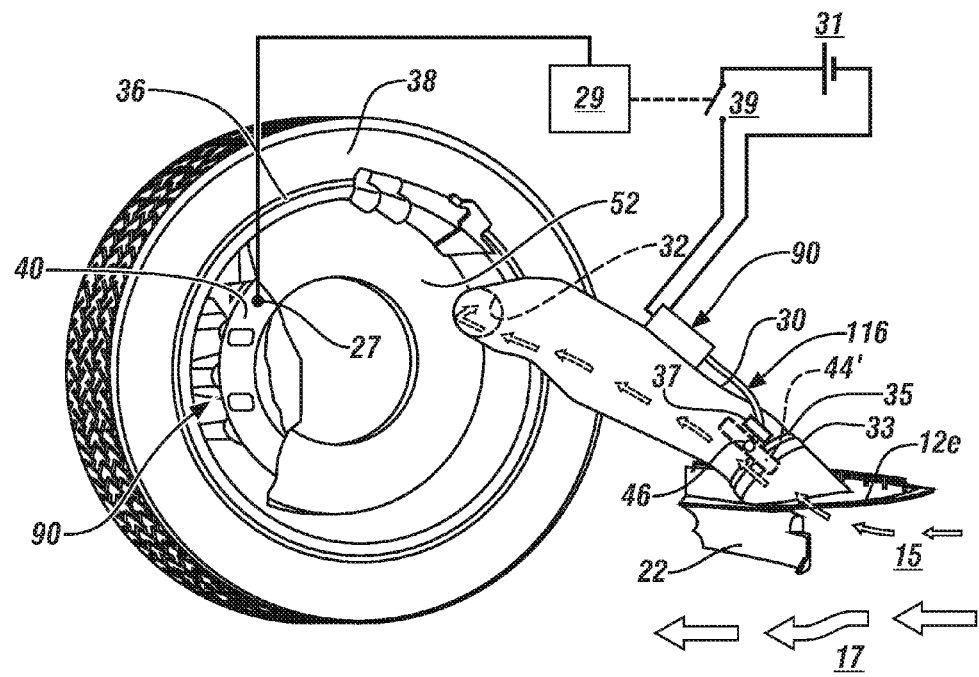
FIG. 1C schematically shows an illustrative embodiment of the invention as applied to a driver's side front brake as viewed looking outward from the vehicle centerline

An exemplary embodiment of the invention is shown, in isolation, in the outwardly-directed view, that is, looking from the vehicle centerline in the direction of the vehicle exterior, of FIG. 1C. In this embodiment, a left, or driver's side, front brake caliper 40 is arranged to engage disc rotor 52 mounted substantially concentrically with tire 38 and wheel 36. A thermally-actuated actuator 90 is exemplarily shown mounted on duct 30. Actuator 90 is connected by cable 116 to a mechanism 37, details not shown, which may enable an open closure 44'. A temperature sensor 27 is shown mounted on brake caliper 40. Sensor 27 may, for example, be a thermocouple, resistance thermometer or thermistor, or any like device capable of outputting an electrical signal proportional to a sensed temperature and interpretable by a controller. Sensor 27 is electrically connected to controller 29 which accepts and interprets the sensor signal, and opens and closes switch 39 as required. Switch 39 controls the flow of electricity from a power source, here shown as battery 31, commonly the vehicle battery, to either actuator 90 as shown or to an external heater (not shown) positioned in thermal communication with actuator 90. Controller 29 may continually accept and act on inputs from sensor 27, and other suitable sensors under more complex control scenarios. More commonly the controller may accept and respond only at periodic intervals corresponding to a frequency of between, say, 0.1 and 1 Hz. Controller 29 may have some computational capability and may be a dedicated stand-alone unit or the brake cooling controller function may be embedded in a general purpose computer or in one of the other controllers on the vehicle such as the Body Control Module or the Engine Control Module.

In this embodiment the closure is shown as a butterfly valve connected to and pivoting with shaft 46, so that mechanism 37 would be adapted to rotate shaft 46. The oncoming airflow is generally divided into two separate flows. Airflow 17 directed toward the lower edge of air dam 22, shown partially cut away, is deflected downward and continues on a path, external to the vehicle which will carry it under the vehicle. Airflow 15, shown directed toward the high pressure region formed at the junction of air dam 22 and the portion of vehicle body to which it is attached (not shown), is collected by inlet 12e. Airflow 15 then passes through open closure 44' and along duct 30 before discharging at 32 to cool disc brake rotor 52.

In this embodiment duct 30 and inlet 12e are separate components. A short length of airflow receiving end of duct 30, not shown, is sized and shaped to slidably enter and engage lip 35 of inlet 12e. Alternatively, the duct-inlet joint may be made by having lip 35 and a suitable portion of inlet 12e slidably enter and engage the airflow-receiving end of duct 30 (not shown). In either embodiment, duct 30 and inlet 12e may be secured to one another using, for example, hose clamp 33. Alternate fastenings may include complementary molded-in features to enable a bayonet-lock or a clip-on attachment. Mechanical fasteners such as screws or rivets may also be used. In this embodiment open closure 44' is located in duct 30.

Figure 2A:
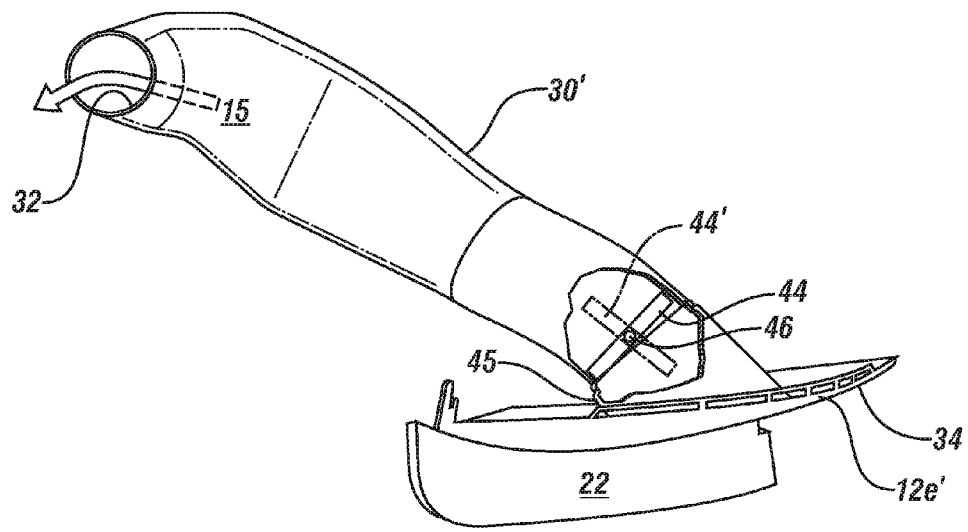
FIGS. 2A-D show an inlet and associated duct with closure device.

Further details of an embodiment of the inlet and its associated duct, are shown in the inwardly-directed side view of FIG. 2A, reflecting the view of a right, or passenger-side, brake to more clearly illustrate the redirection of airflow 15 as it approaches opening 32. In this depiction only a single opening 32 is shown but, where it may be advantageous, a plurality of openings may be employed to better direct the cooling airflow onto the heated regions of the brake. In the embodiment shown in FIG. 2A, duct 30' and inlet 12e' are shown as a one piece unit with no mechanical attachment therebetween. For clarity, actuator 90, mechanism 37 and cable 116 are not shown in this view.

In its 'closed' position 44, the closure may deny access of cooling air, while in its 'open' position 44' enable substantially free passage of cooling air to brake disc 52 (FIG. 1C). Again, the closure is shown as butterfly valve pivoting with supporting shaft 46. Of course, the closure may also adopt a plurality of positions intermediate between closed position 44 and open position 44'. It is however intended, in this embodiment, that the closure preponderantly be in either its open or closed positions and spend minimal time in its intermediate configurations.

Figure 2B:
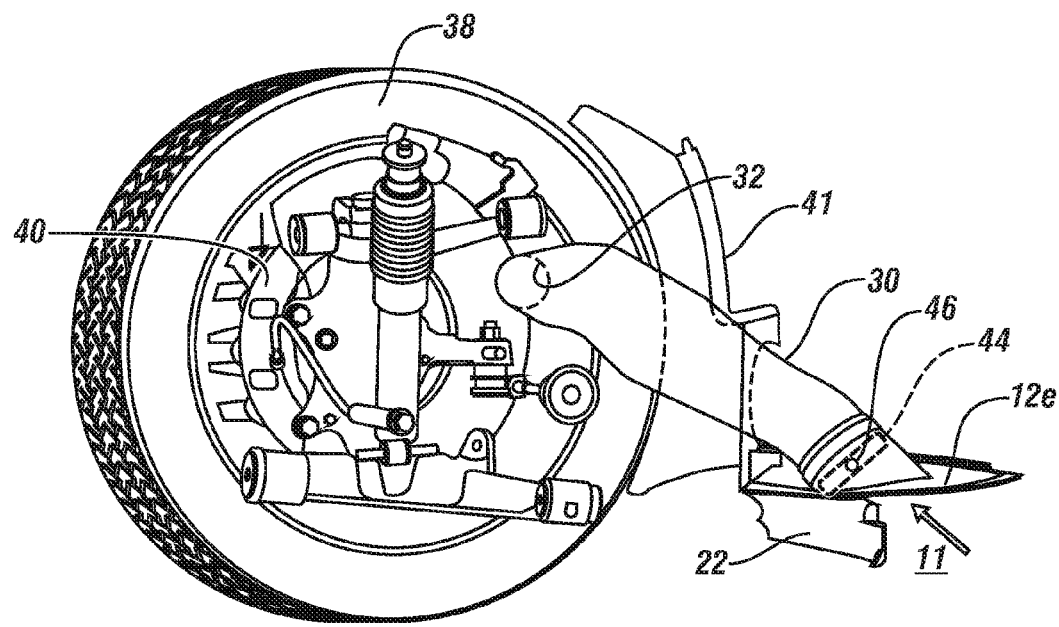

Inlet 12e' has an exterior surface 34 and a smoothly varying throat section 45, intended to gather and admit air without inducing undue turbulence. FIG. 2B shows a view (again omitting actuator 90, mechanism 37, cable 116 as well as sensor 27) generally similar to the left front brake view of FIG. 1C but also showing some (unlabelled) suspension components and a portion of vehicle structure around the wheel well at 41. FIG. 2B illustrates the packaging issues raised by the integration of such a system into a vehicle. In FIG. 2B closed closure 44 and its associated shaft 46 are shown positioned in inlet 12e.

Figure 2C:
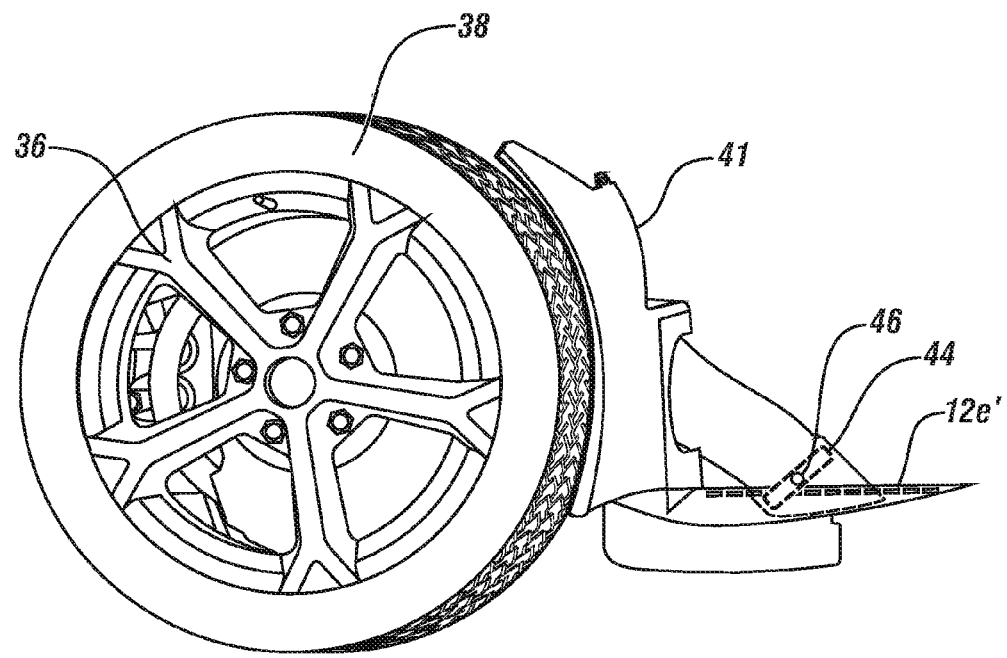
Figure 2D:
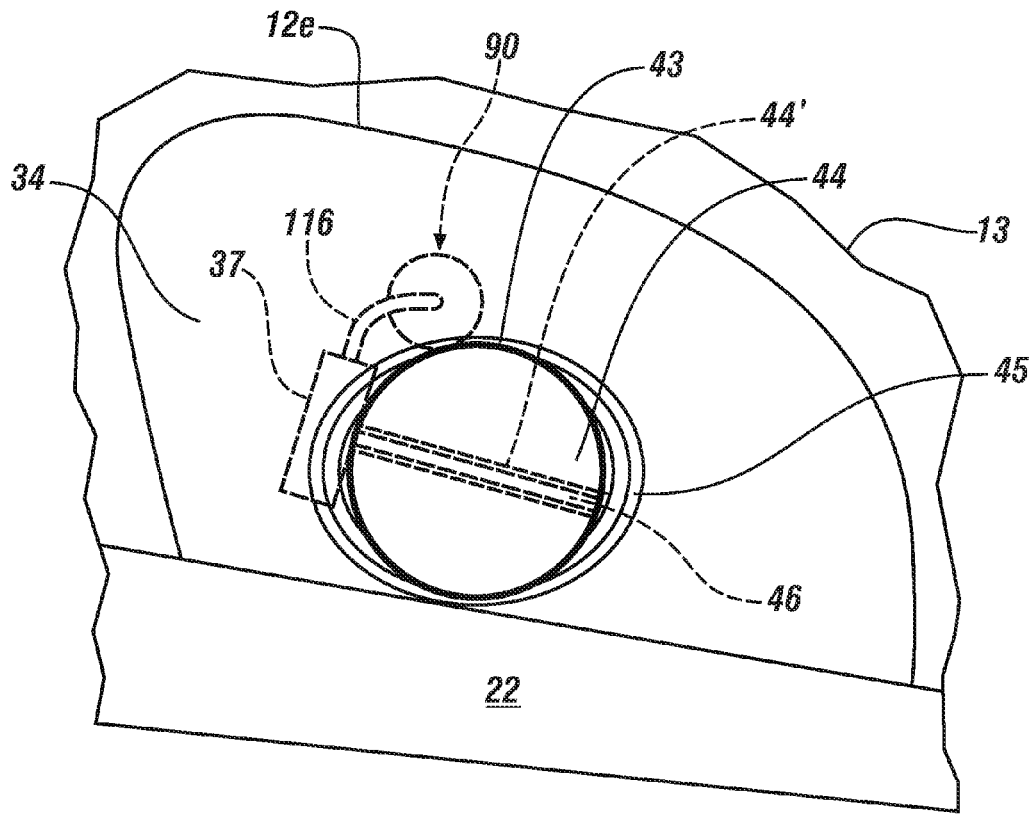

FIG. 2C shows the view generally corresponding to the right wheel view of FIG. 2B, but in a direction from outside the vehicle to further illustrate the integration of the system into the vehicle. FIG. 2D shows a head-on view of inlet 12e, that is generally along arrow 11 in FIG. 2B to illustrate the relative placement of inlet 12e and air dam 22 and to further illustrate the smooth transition from surface 34 to throat 45. A representative placement for mechanism 37 and for actuator 90, both of which may be mounted on either of duct 30 or 30' (not shown in this view), is illustrated. It will be appreciated that the structure and placement of actuator 90 and mechanism 37 may vary.

In this embodiment inlet 12e is a discrete structure, separate from adjacent body structure 13, with a surface 34, suitably attached to body structure 13 and abutting air dam 22. Inlet 12e has a faired throat section 45 which smoothly transitions to a generally circular opening 43 closable by a suitable closure, for example a butterfly valve. Open closure 44' provides minimal impediment to airflow, enabling flow of cooling air through duct 30 and discharge opening 32 to brake disc 52. In other embodiments where an inlet is located at a molded polymer vehicle component, such as a front fascia, it may be molded into the component as an integral feature.

Figure 2E:
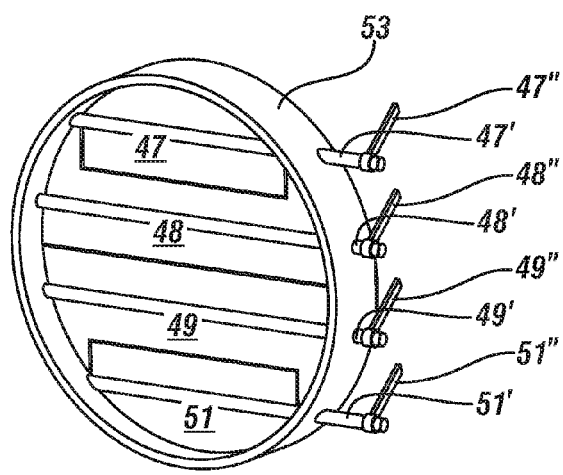
FIG. 2E shows a closure device in isolation.

The depiction of the closure as a butterfly valve is exemplary only and alternative closure devices may be employed. These may include, for example, a ball valve, a gate valve, a louver valve, an iris valve and a plug valve among others. Each of these inlet valves may serve to progressively pass or block airflow as required when combined with an actuator capable of providing sufficient force and range of motion to cycle the valve from its closed to its open position and vice versa. Thus, the choice of valve type should be informed by, and compatible with, the range of motion available from a chosen actuator. Each of these closure types is intended to operate under on-off control, either fully open or fully closed. In some embodiments, a range of airflows may be preferred. This may be achieved, for example, by the use of a louver valve in which each louver is controlled and operated independently. An example of such a valve, mounted on a support 53 and suited for installation in duct 30, is shown in isolation at FIG. 2E. Each of louvers 47, 48, 49 and 50 is mounted independently on its associated shaft 47', 48', 49' and 50' and operated by attached levers 47", 48" 49" and 51". Thus each shaft may be rotated and independently so that a plurality of flow rates may be obtained by opening a suitable combination of louvers even though each individual louver is restricted to adopt only an open or a closed configuration.

The closeable inlet and duct affords opportunity to manage vehicle drag since the vehicle drag coefficient is lowered when the inlets are closed rather than open. Preferably the closure is located close to the inlet opening, suitably within the span of about 30% of the duct length downstream of the inlet. But, with good closure sealing, comparable improvements in drag coefficient may obtain even when the closure is positioned at, or near, the terminal end of the duct and discharge opening 32 of FIG. 1C.

Paraffin actuators make use of the marked volume expansion undergone by paraffins on melting, to reversibly displace a piston in a cylinder. In many applications a bias spring may assist in reverse operation to re-establish the low temperature solid configuration. The operating temperature range of such actuators is selectable by the choice of paraffin composition.

Shape memory alloys or SMAs are metallic alloys which transform from one phase to another at relatively modest temperatures, generally of less than 300° C. or so. The two phases have markedly different properties with the high temperature phase, generically known as austenite, being strong and stiff, while the low temperature phase, generically known as martensite, is less stiff and weaker. Transformation occurs over a narrow temperature range which depends on the composition of the selected SMA alloy and the magnitude of the applied load. Transformation temperatures ranging from about −100° C. to 300° C. have been observed, but, more commonly alloy compositions offering transformation in the temperature range of 0° C. to 200° C. or so find application. Remarkably, modest deformation of, say less than 8% or so, in the martensite phase may be essentially completely recovered on heating the alloy in its deformed martensite phase to a temperature where it transforms to its austenite phase.

In operation an SMA alloy, often in the form of a wire, tape, cable or similar elongate shape, is annealed at elevated temperatures much greater than the martensite to austenite transformation temperature. When cooled below the austenite to martensite transformation temperature the alloy will adopt its martensite phase and be readily deformable. A controlled deformation, applied, for example, by a biasing spring or a deadweight or similar, may reshape the SMA into a second shape which will be maintained as long as the lower temperature martensite structure is retained.

On heating the SMA to its martensite to austenite transformation temperature, or higher, the SMA will transform to its stronger, stiffer higher temperature austenite phase. As it does so, it overcomes the influence of the biasing spring, or similar, and restores the SMA to its initial shape and configuration. Provided the strain imposed during the deformation imposed when the SMA is in its martensite phase is controlled and limited to no more than about 8% strain, this cycle of transformation from austenite to martensite and vice versa may be repeated, nearly indefinitely. Further, in transforming from martensite to austenite the SMA generates appreciable force, above and beyond that necessary to overcome the biasing spring. This force may be harnessed and suitably communicated to a mechanism using a rigid or cable linkage to operate a device, such as the closeable inlet described previously.

As noted, SMAs used in actuators are often in the form of wires, braids, tapes, cables or other such elongated geometries. However the need to minimize the maximum strain to 8% or so may make actuators fabricated of linear arrangements of such forms undesirably bulky when large displacements are required. More compact designs may be developed by winding the wire, or similar elongated form of SMA, into the shape of a coil spring. Both such designs are illustrated in the exemplary SMA actuators described in later sections.

The utility of SMA actuators in this application depends upon the availability of a series of SMA alloys with a range of transformation temperatures appropriate to the need to respond at a temperature appropriate to a need for supplementary brake cooling. Fortunately, shape memory behavior has been observed in a large number of alloy systems including Ni—Ti, Cu—Zn—Al, Cu—Al—Ni, Ti—Nb, Au—Cu—Zn, Cu—Zn—Sn, Cu—Zn—Si, Ag—Cd Cu—Sn, Cu—Zn—Ga, Ni—Al, Fe—Pt, Ti—Pd—Ni, Fe—Mn—Si, Au—Zd, and Cu—Zn and phase transformation may occur over the temperature range of from between about −100° C. to about +150° C. or so, with specialized alloys transforming at up to about 300° C. Although such theory is not relied upon, there is some indication that the transformation temperature may be correlated with the ratio of valence electrons per atom.

Of these many compositions, alloys of nickel and titanium in near-equi-atomic proportion enjoy the widest use, but, even in this alloy system, minor changes in composition may induce significant differences in transformation temperature. For example changing the nickel/titanium ratio of the alloy from about 0.96 to about 1.04 may change the transformation temperature from about +70° C. to about −100° C. Thus it is feasible to 'tailor' the properties of an SMA so that transformation occurs at any suitable pre-selected temperature.

Since the actuator responds to an external heat source rather than the brake temperature directly, the actuator may be positioned at any vehicle location which admits of convenient mechanical communication between the actuator and the closure. If the actuator may be mounted on the inlet or duct a direct connection between the actuator and closure may be feasible. Where the actuator is mounted remotely, actuator-closure communication may employ a cable linkage for routing flexibility, but rigid linkages and combinations of cable and rigid linkages may also be employed.

As noted, these actuators, paraffin and SMA, are responsive to temperature. While it is intended that the temperature rise or decrease which operates the actuator be controlled externally by a controller responding to a sensed brake temperature, it will be appreciated that the actuator will respond to any suitable temperature increase or decrease which produces a phase change. Thus, if the actuator is placed where it will achieve its operating temperature during normal vehicle operation, the closure will open irrespective of the current brake temperature. Similarly, if an actuator is positioned where heat may not be readily removed, the closure may remain open even though the brakes may have cooled to a temperature within their normal operating range. These outcomes may be avoided by selecting an actuator with a suitably high transformation temperature and by locating the actuator in a well-cooled location. Preferably the actuator may be located where it is exposed to at least a portion of the cooling airflow directed to the brakes so that the thermal response of the actuator may generally mimic that of the brakes. Where external heating is used, in contrast to the intrinsic Joule heating applicable to SMA elements, it may also be advantageous use thermoelectric devices. Such thermoelectric elements may also function as refrigerators by reversal of current flow and so may promote more rapid actuator cooling for prompt shut-off of the air flow. It is preferred that the closure, or individual closure elements in devices intended to promote varying flow rates, rapidly transition between its/their open and closed states in response to a signal from the controller. Thus an actuator with a low actuation temperature is preferred provided the actuation temperature is sufficiently high to avoid inadvertent operation under high or extreme ambient conditions. This will ensure that operation will occur only when external heat is provided to the actuator, while minimizing the quantity of heat to be provided or extracted for intended actuator operation. It will be appreciated that the local temperature experienced by the actuator will vary with placement location of the actuator on the vehicle, and that the maximum local temperature may occur after the vehicle is parked after running or even when parked under a hot sun. Generally actuators intended for operation in the range of 80° C.-100° C. are suitable. This is a temperature range readily met by commercially-available SMA-based and paraffin-based actuators.

The brake temperatures of interest are those experienced by the friction material and the surface which it engages. But it will be appreciated that the engaged surface, the rotor 52 of disc brakes 50 (shown in FIGS. 3A and 3B) and the drum 72 of drum brakes 70 (shown in FIG. 4), rotate, so that a sensor mounted on such a component will require a slip ring or similar to convey the signal to the controller. For this reason the sensor will typically be mounted on a non-rotating brake component. The friction material, pad 54 (FIGS. 3A and 3B) and lining 74 (FIG. 4), wear in use, requiring that the any sensor placed there be replaced as the pad or lining is replaced. This may not be a significant concern if economical sensors, such as thermistors or base metal thermocouples are used, but, more commonly it will be preferred to locate a contact sensor an another, non-rotating component and infer, through modeling and/or experiment, the brake temperature from the sensed temperature.

Figure 3A:
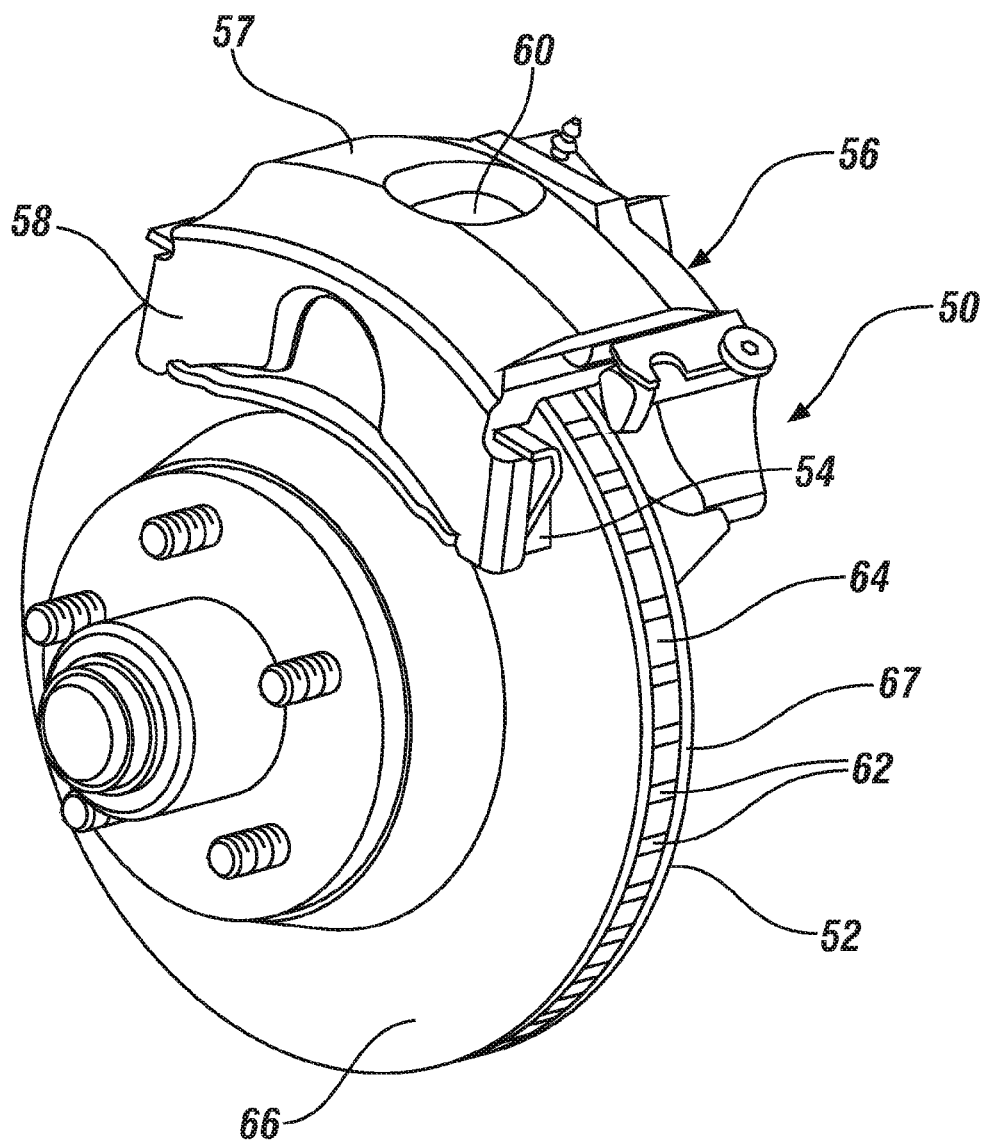
FIG. 3A shows, in perspective view, elements of a disc brake assembly positioned as they are mounted on a vehicle axle.
Figure 4:
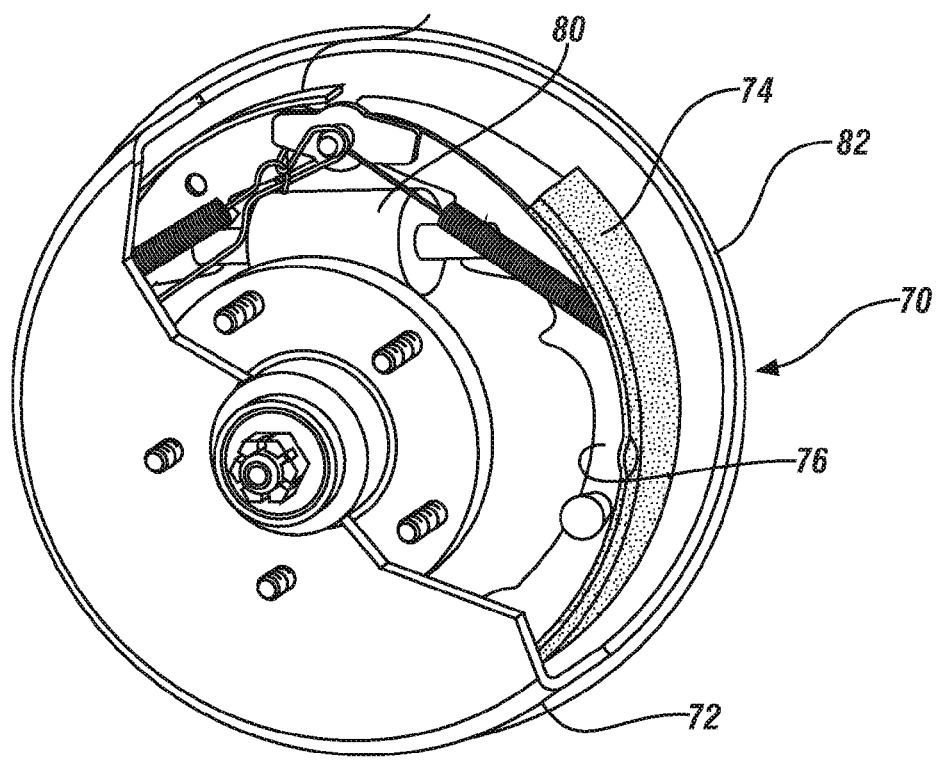
FIG. 4 shows, in perspective view and partial cutaway, a drum brake positioned as mounted on a vehicle axle.

Suitable locations include, for example the brake caliper assembly 56 of a disc brake (FIG. 3A) or backing plate 82 of a drum brake (FIG. 4). When located on the caliper assembly the temperature sensor need not be replaced with every change of brake pads, possibly justifying the use of more expensive higher precision temperature sensors, such as resistance temperature sensors, in addition to thermistors and thermocouples. Contact temperature sensors may be positioned on the surface, or in a suitable recess or cavity (not shown) in support structure 58. The use of other sensors, such as non-contacting infra-red (IR) sensors is challenging because of the need to shield them against exposure to impact with debris, road splash and/or other possible environmental challenges inside the wheel well. If a suitable shielding strategy can be developed such an IR sensor may preferably be aimed at the rotor (of a disc brake) or the drum (of a drum brake) to measure the rotor and drum temperature directly.

Figure 3B:
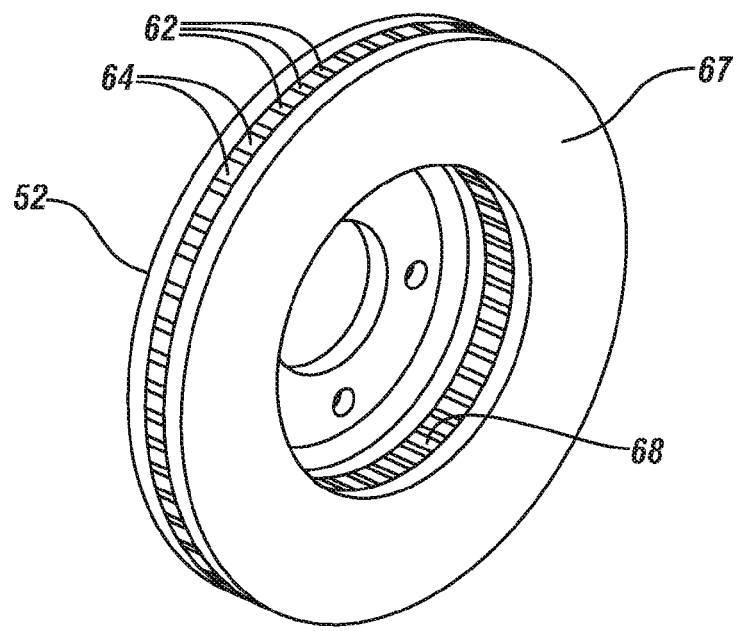
FIG. 3B shows the brake rotor in isolation and viewed from the opposing direction.

As shown in FIGS. 3A and 3B, many disc brake rotors 52 have pad-contacting surfaces 66, 67 separated by ribs or vanes 62 with intervening channels terminating in a plurality of openings 64 at the outer periphery of the rotor. When the rotor 52 is rotating, this internal vane-channel structure serves to pump cooling air, drawn through openings 68 (FIG. 3B) on the inner surface of the disc adjacent pad-contacting surface 67, through the rotor, before discharging it at openings 64.

Many caliper support structures 58 therefore have an opening or gap on their upper surface, such as at 60 in FIG. 3A, to minimize any impediment to the heated air discharge. Thus, a compact sensor placed over opening 60, or like opening, would, provided it did not excessively impede flow of the heated air, be heated directly by such heated air. Again, a suitable correlation between the vent air temperature and the brake temperature may need to be determined through modeling, experiment or a combination of both.

When supplementary brake cooling would be beneficial it may be feasible, subject to packaging constraints, to direct the cooling air directly onto the brake system rather than simply discharging it generally into the vehicle wheel well. Preferably the air may be even more precisely directed so that, for example, brake systems employing vented discs like that shown in FIGS. 3A and 3B, will receive the cooling air at rotor inlet openings 68. When solid, non-vented discs are used, it may be more effective to direct the cooling air toward the outer periphery of the disc, generally at the location contacted by the brake pads. Access to the interior, brake shoe-contacting surface of drum 72 in a drum brake (FIG. 4) is not generally feasible so that cooling air may best be directed to the outer surface of drum 72.

Figure 5A:
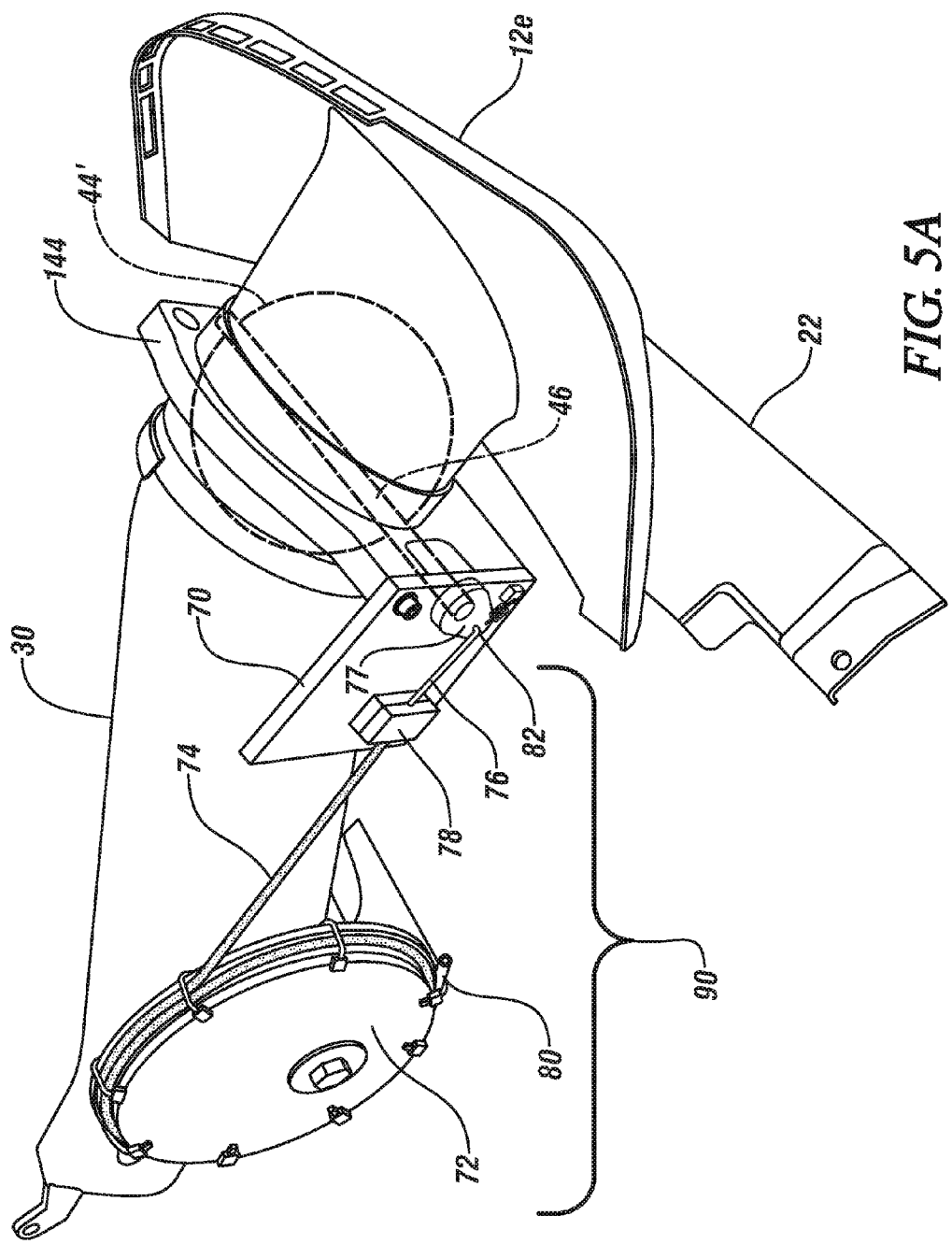
FIG. 5A shows, in perspective view, a first embodiment of a representative SMA actuator employing an extended length of SMA.
Figure 5B:
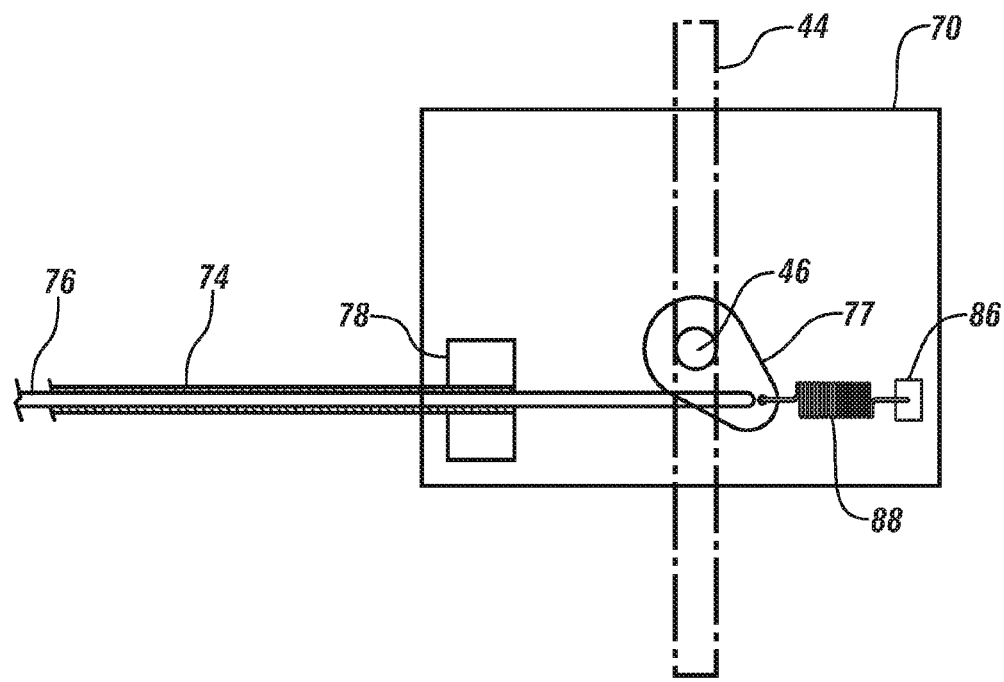
FIGS. 5B and 5C show details of the means by which the SMA actuator of FIG. 5A may operate a closure.

A suitable SMA actuator 90 comprising an SMA element 76 in sheath 74 and support 72 is shown in conjunction with a compatible duct, inlet and closure in FIG. 5A. In this embodiment, inlet 12e, shown secured to a portion of air dam 22 is connected to duct 30 through a closure body 144 supporting open closure 44', again depicted as a butterfly valve, and its supporting shaft 46. A suitable length of SMA element 76, slidably enclosed in sheath 74, is wound around the circumference of disc-like support 72. One end 80 of SMA element 76 and its associated sheath 74 is secured to the support 72 circumference at a common location and the other end 82 of element 76 is attached to a lever 77, or similar, mounted to shaft 46 of closure 44'. Sheath 74 is secured at support block 78 attached to mounting plate 70 secured to closure housing 144. Mounting plate 70, and associated features, is shown in greater detail in FIGS. 5B and 5C. In FIG. 5B, SMA element 76, here shown in its martensite phase, and spring 88 are mounted in series. Interposed between spring 88 and SMA element 76 is lever 77 connected to shaft 46. An end of each of spring 88 and SMA element 76 is attached near the extremity of lever 77 distant from shaft 46. The opposing end of spring 88 is secured to block 86 which, in turn, is secured to mounting plate 70.

Figure 5C:
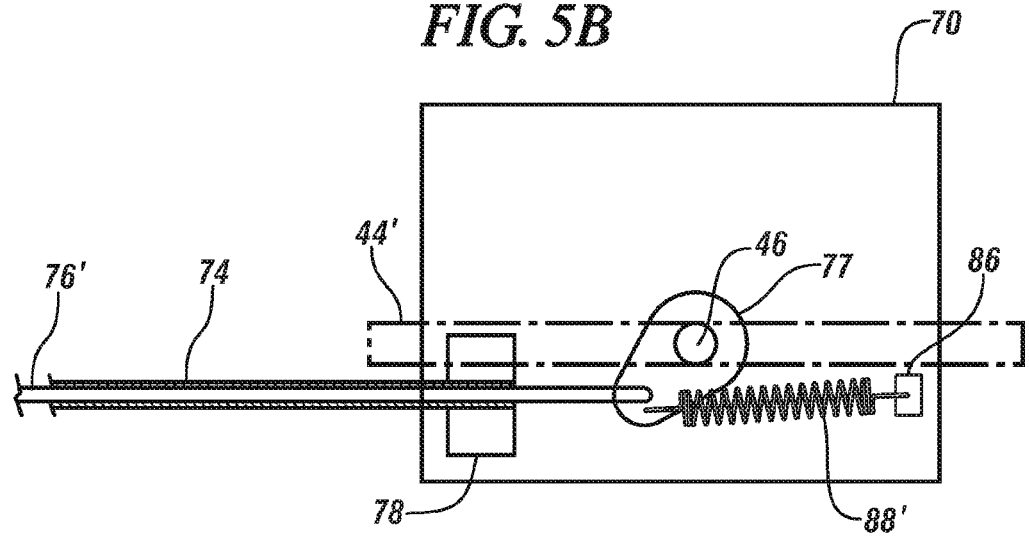

In operation, martensite SMA element 76 (FIG. 5B) may be deformed by bias spring 88, orienting lever 77 at a generally 4 o'clock position and rotating shaft 46 to orient the closure in its closed 44 configuration. On heating martensite element 76 above its martensite to austenite transformation temperature, the element transforms to its austenite phase 76' (FIG. 5C). As it transforms it reverts to its undeformed length, sliding within sheath 74, secured at support block 78, as it does so, and extending biasing spring 88' to orient lever 77 at a generally 8 o'clock position to rotate shaft 46 and orient the closure in its open 44' position as shown at FIG. 5C. It will be appreciated that the diameter of support 72 (FIG. 5A) should be chosen such as to minimize friction between SMA element 76 and sheath 74 to achieve the full range of closure motion. Suitably the diameter of support 72 may range from about 100 millimeters to about 200 millimeters. Cooling austenite SMA element 76' below its austenite to martensite transformation temperature will enable biasing spring 88' to deform now-martensite element 76, extending it, and restoring the closure to its closed position 44. Thus, the length of the SMA element should be sufficient to enable displacement of lever 77 from its 8 o'clock (open) position to its 4 o'clock (closed) position without exceeding 8% strain in the SMA element.

In this embodiment the SMA element may most commonly be a wire, but any elongated form of SMA such as a cable, tape, braid or similar may be substituted without detriment to the operation of the device as described.

Sheath 74 may serve to protect the SMA element against road splash or abrasion by dirt, dust or other road hazards. Sheath 74 may also serve as an electrical insulator. One convenient means of heating such an elongated SMA element is electric resistance heating. Thus, the SMA element may be heated by making electrical connection to the SMA element close to, or at, at the element extremities and passing electric current along substantially the length of the element. A suitable source of electric power may be the vehicle battery. Such a process is very effective in promoting a highly uniform temperature along the entire element length and enables readily-controlled, rapid heating. Of course, at least that portion of SMA element 76 which is wrapped around support 72 must be electrically insulated to avoid a short circuit between contacting lengths of element 76 or between element 76 and support 72

An SMA element with a nominal transformation temperature of about 70° C. or so may experience maximum temperatures of 160° C.-180° C. Sheath 74 must be tolerant of such temperatures and so may incorporate a braided fiberglass or ceramic sleeve impregnated with a polymer such as vinyl, acrylic or silicone suited for long term exposure to such temperatures. To provide protection against external abrasion or wear it may be preferred to enclose such electrically-insulated sheathing within a braided metal sleeve or to wrap the electrically insulated sheathing with a flexible, helically wound wire reinforcing structure.

In FIG. 5A the operating mechanism for the closure is shown mounted on the exterior of duct 30. However, it will be appreciated that the mechanism may readily be placed on, and supported by, the inner surface of duct 30. With such placement, assembly may be facilitated if duct 30 comprises two parts with mating surfaces extending the length of the duct to facilitate access to the duct interior. Placing the mechanism inside the duct and in contact with the cooling air flow would promote more rapid cooling of the SMA and so more quickly restore the vehicle to its lower drag, closure-closed configuration when supplementary brake cooling was not required.

Figure 6A:
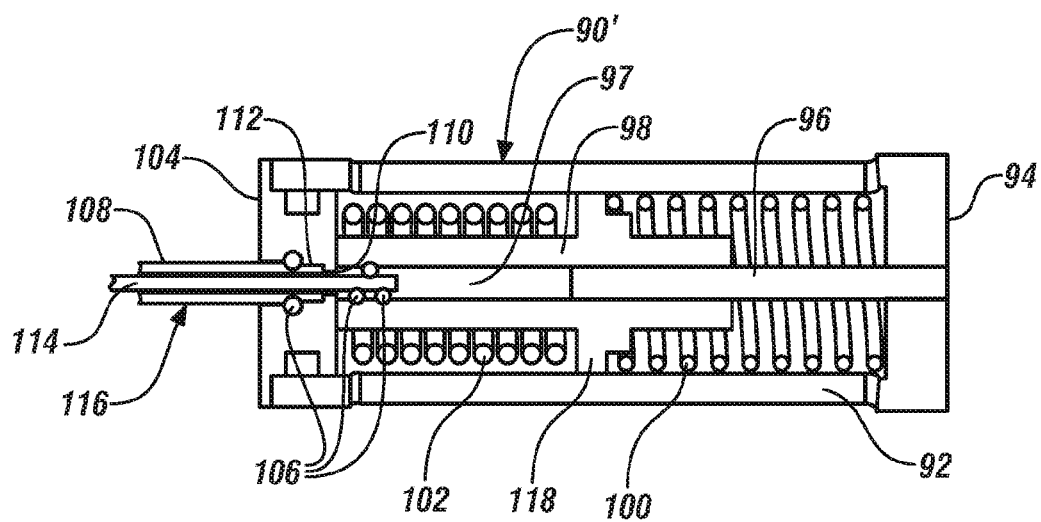
FIGS. 6A and 6B shows a second embodiment of a representative SMA actuator employing an SMA element in the form of a helical spring and employing external heating.

FIG. 6A shows a more compact actuator 90' in which a wire or rod-like SMA element has been wound into the form of a compression spring 102. Actuator 90' includes a generally cylindrical case 92 terminated on an end face by closed endcap 94 and on its opposing end by endcap 104 incorporating through-hole 110 sized to enable free passage of wire 114 of cable 116. Endcap 104 also incorporates recess 112, concentric with through-hole 110 and sized to accommodate cable sheath 108 of cable 116. Internal to actuator case 92, a slidable, flanged sleeve 98 is supported on the inner, cylindrical walls of case 92 and by guidepost 96 located on the cylinder axis of case 92. Slidable sleeve 98 partitions the interior cavity of case 92 into two portions. In a first portion bounded by endcap 104, is an SMA spring 102, here shown compressed and in its martensite phase. In a second portion bias spring 100 is shown in its extended position. Each of SMA spring 102 and bias spring 100 acts on the opposing surfaces of flange portion 118 of slidable sleeve 98 so that sleeve 98 may be displaced by whichever of springs 102 and 100 is the stronger. Slidable sleeve 98 is sized, in its hollow portion which engages guidepost 96 to accept wire 114 of cable 116. Wire 114 may be secured and retained within this cavity in any suitable manner but is here shown, without limitation, as being restrained by engagement with mechanically interfering features 106. Similar mechanically interfering features, again without limitation, are shown as engaging and restraining sheath 108 of cable 116 to secure it within recess 112.

In operation, transformation of SMA spring 102 will displace sleeve 98 and, with it, wire 114. When SMA spring 102 is in its martensite phase as shown in FIG. 6 it may be compressed by bias spring 100. Heating SMA spring above its martensite to austenite transformation temperature however will lengthen SMA spring 102, overpower bias spring 100 and compress bias spring 100 while displacing sleeve 98 toward endcap 94 and tensioning wire 114. Thus repeated cycling between temperatures at which the SMA is in its martensite phase and its austenite phase enables reciprocating motion of wire 114.

Figure 6B:
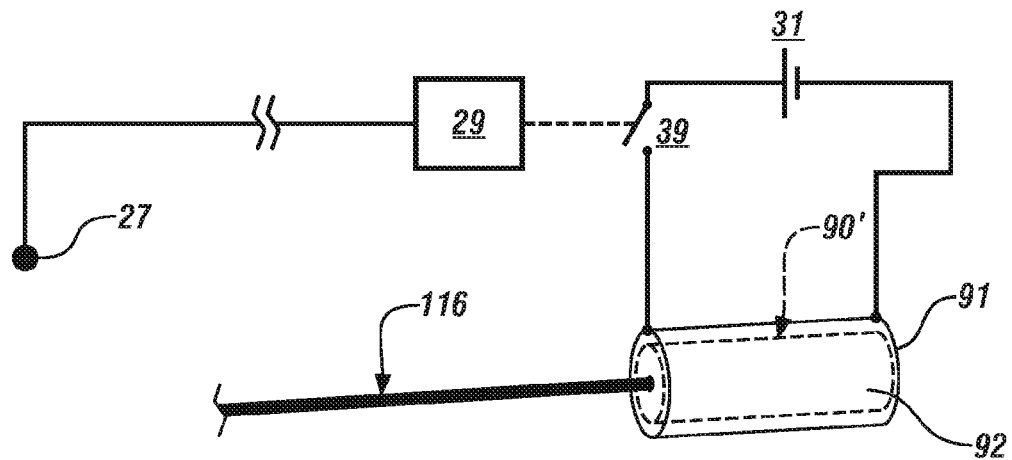

No heat source is shown in FIG. 6A. With placement of appropriate insulation on the coils of spring 102, for example a high temperature sleeve like that described previously, and suitable choice of electrically non-conductive case 92 and slidable sleeve 98 materials, electric resistance heating may be employed as described previously. Alternatively, as shown in FIG. 6B, case 92 may heated by a cartridge heater, here shown in the form of a hollow, close-fitting cylinder 91 to heat SMA spring 102. As before, cartridge heater 91 receives power from battery 31 when switch 39 is closed by controller 29 in response to a brake (not shown) temperature sensed by sensor 27. Thermoelectric heaters may also be used.

Figure 7C:
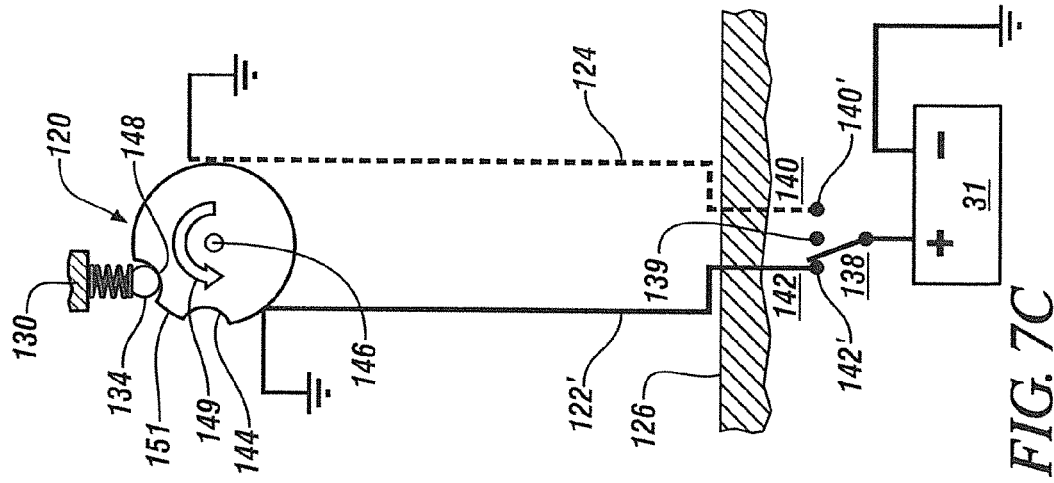
FIGS. 7A-C show an actuator employing two opposed SMA elements and a latching mechanism.

In the embodiments shown, the closure opens, and is maintained open, under the force applied by the heated SMA element. Thus, in these embodiments, and in embodiments employing a paraffin actuator, power is expended to heat the SMA element during the entire period the closure is open. However a latching mechanism, for example a plunger and complementary notch, may be incorporated into the mechanism to hold the closure in its powered-on position. Preferably such a latching mechanism would incorporate a suitably wired switch to automatically discontinue application of power when the device is latched. To change the closure configuration the latch would first need to be released so that the bias spring may suitably modify the shape of the SMA element. A cam follower-type mechanism similar to that used in retractable ball point pens may be used to render the latch releaseable or latch release may be accomplished by briefly powering a second SMA element to withdraw the latch from engagement with the mechanism. Any SMA element used to release the latch may advantageously be selected for compatibility with the primary, closure-controlling SMA element, and so may be of similar composition and operate over a similar temperature range An alternate design for a latching actuator, also employing multiple SMA elements, is shown, schematically, in FIGS. 7A-C. As shown in FIG. 7A, actuator 120 incorporates two antagonistically-arranged SMA elements. Element 122, shown in its martensite phase and element 124' shown in its austenite phase. One end of each SMA element 122, 124' is attached to support 126 and the other end to opposed locations on generally circular member 128. Circular member 128 is mounted on rotatable shaft 146 so that member 128 and shaft 146 may rotate together. Member 128 incorporates on its periphery two spaced apart detents 144, 148 sized and shaped to engage spring-loaded ball 134. Ball 134 is urged against the member 128 periphery or detents 144, 148 under the action of compression spring 132 acting against support 130. SMA elements 122, 124' are connected at the end attached to support 126 to electrical wires 142, 140 respectively, each of which terminates in a terminal 142', 140' selectable by switch 138. Switch 138 is connected to a terminal, here shown exemplarily as the positive or '+' terminal, of battery 31. The other battery terminal, exemplarily the negative battery terminal is connected to a vehicle ground, as are the SMA element ends attached to member 128. Thus, by appropriately positioning switch 138 an electrical circuit may be made which passes current through one or other of terminals 140', 142' to its associated SMA element. Switch 138 may also adopt a configuration, connected to terminal 139, in which no current passes through either SMA element.

In FIG. 7A switch 138 is positioned to pass current through SMA element 124'. The passage of current will heat SMA element 124', causing it to transform to austenite, and shorten in length so that it applies a force to the periphery of member 128 and thereby causes it to rotate as shown by arrow 147. The rotation induced by SMA element 124' is not opposed by SMA element 122, in its martensite phase, which deforms under the load applied by SMA element 124' and is stretched to adopt a length appreciably greater than that of SMA element 124'. Rotation of member 128 continues until at least near-complete transformation of SMA element 124' occurs and ball 134 substantially fully engages detent 144 as shown.

Figure 7B:
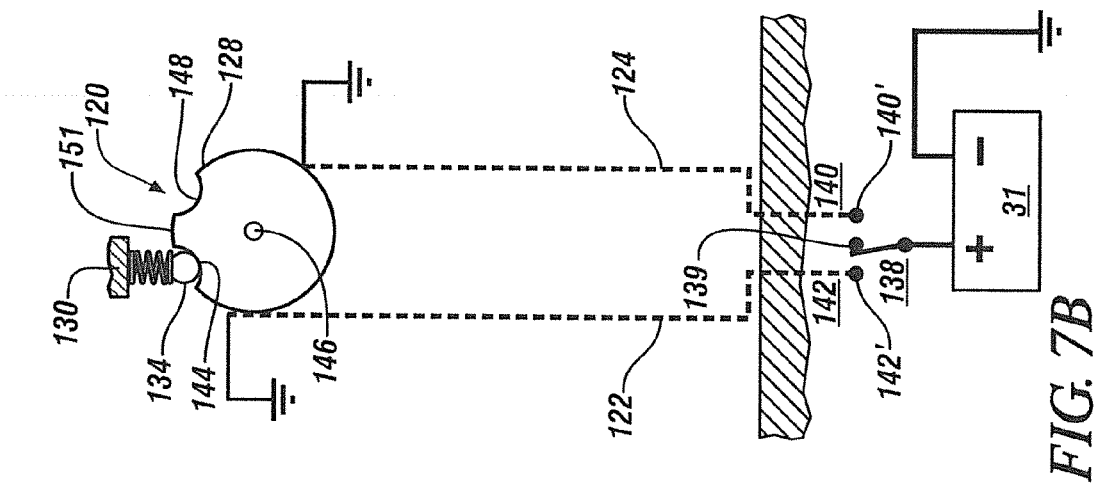
Figure 7A:
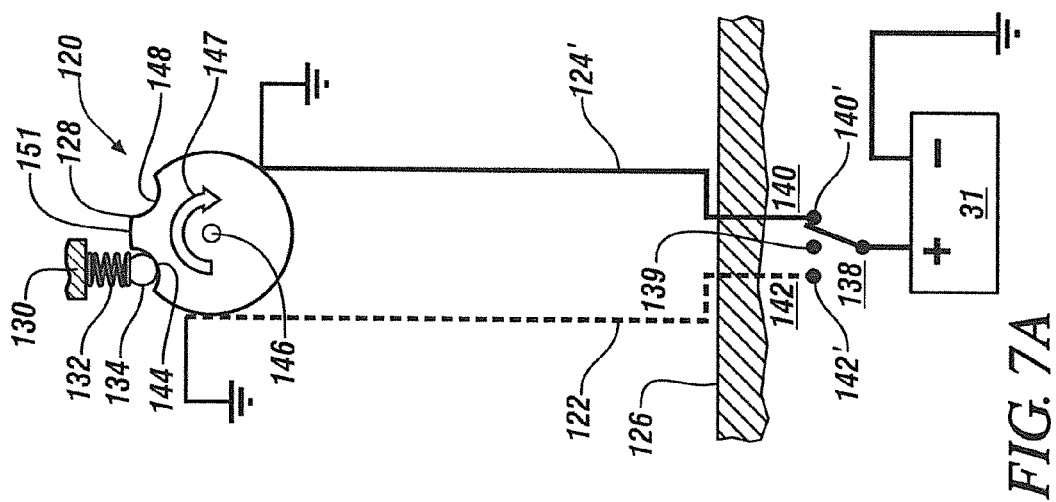

In FIG. 7B, switch 138 is connected to terminal 139 so that no current is passed through either SMA element. Now SMA element 124' (FIG. 7A) will cool and transform to martensite so that both SMA elements are in their deformable martensite phase. However, member 128 continues to maintain its previous position due to the engagement of ball 134 with detent 144.

In FIG. 7C, switch 138 is positioned to pass current through SMA element 122 (FIG. 7B), heating it and transforming it to austenite SMA element 122' so that it contracts, rotating member 128 as shown at arrow 149 and, when transformation is at least near-complete, engaging ball 134 with detent 148. Such motion is not opposed by soft SMA element 124 in its martensite phase.

Thus, in this embodiment the two SMA elements, arranged in opposition, rotate member 128 with rotation being maintained, even in the absence of applied power, by the interaction of ball 134 with, alternately, detents 144, 148 and the process may be repeated indefinitely. Of course, by attaching shaft 146 to a suitable closure, not shown, the rotational motion of member 128, communicated to shaft 146 may open and close the closure as required.

It may be noted that the geometry of member 128 provides some snap-action characteristics to the rotation of member 128. Member 128 seeks to rotate in response to the transformation from martensite to austenite of either of martensite SMA elements 122, 124. But, the motion of member 128 requires that ball 134 be displaced, against the urging of spring 132 to clear the detent wall. This requires that the overall force applied must increase until a sufficiently-large force component is directed along the line of action of spring to suitably compress the spring and enable the ball to ride along the periphery 151 of mount 128. When the driving force developed by the SMA element has reached this level the SMA will act as a spring, releasing stored energy and rapidly and abruptly rotating the mount 128 to promote rapid engagement of ball 134 with the second detent.

The transformations in SMA, austenite to martensite and martensite to austenite, occur over a temperature range with the extent of transformation and the associated displacement progressing smoothly from a transformation start temperature to a transformation finish temperature. This behavior suggests that closure 126 of FIG. 5B will gradually open, starting at the transformation start temperature and will not be fully open until the transformation finish temperature is achieved. The temperature range for complete transformation may be up to about 50° C. or so. But in this application it is preferred to use alloys with a narrower transformation range of about 15° C. or so. Because the actuator is externally powered the time duration for opening the closure may be adjusted as appropriate by control of the applied current.

A characteristic of SMAs is that the transformations exhibit hysteresis, that is, the start temperature of the austenite to martensite transformation is less than the finish temperature of the martensite to austenite transformation. Typically the temperature hysteresis is 20° C. or so but with appropriate processing it may be reduced to about 10° C. or even to about 5° C. Such hysteresis is desirable since it minimizes 'hunting' or 'jitter' in which, in this situation, small temperature changes would lead to wild swings in the state of the closure. With hysteresis, the closure, once opened by the actuator will remain open until the actuator temperature decreases by the inherent temperature hysteresis of the SMA wire or spring, rather than responding to much smaller temperature swings. If more controllable hysteresis is required, the controller may begin to heat the actuator at a first predetermined brake temperature and cease heating only when the brake system attains a lower predetermined temperature.

The choice of actuation temperature for any actuator should be informed by knowledge of the relationship between the brake pad temperature and the sense location temperature. The frictional heat generated by the interaction of the brake rotor and pad or of the brake drum and lining will be dissipated by convection and conduction, establishing a temperature gradient in the brake system. Hence, different brake components, and even portions of individual components, will attain different temperatures. Thus, the relationship between brake temperature and the temperature at the sensed location must be determined, preferably under transient conditions. This relationship may be determined analytically, but, more commonly, will be based on computer models, or experiment, or a combination of both.

A further smart material-powered device is a paraffin-based actuator. Such paraffin actuators harness the power of thermal expansion of the paraffin as it melts and changes from solid to liquid to move a piston. The extent of motion and the load developed as the paraffin expands may be appreciable since, in some paraffins currently in commercial use the volume expansion on melting may be up to 40%. The actuators, by appropriate choice of the carbon number of the paraffin used, may operate in a temperature range of from about 0° C. to about 150° C. More commonly though, paraffin actuators may employ alkanes with carbon numbers ranging from about 20 to 60-80 to provide a useful operating temperature range of from about 35° C. to about 110° C.

Cooling the actuator to solidify the molten paraffin reverses the process, shrinking the paraffin volume and retracting the piston. In many applications an assist return spring may be used. The spring may be integral with the actuator or external to the actuator. In some actuators a deformable diaphragm may provide the spring action.

Figure 8A:
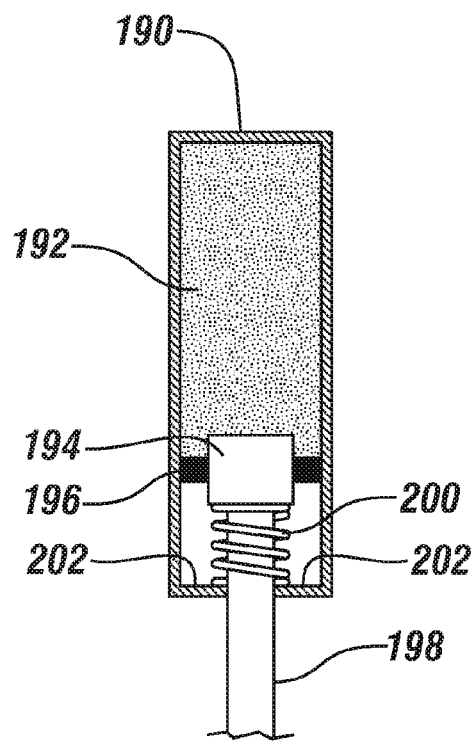
FIG. 8A shows a representative paraffin actuator with the paraffin in its solid form.
Figure 8B:
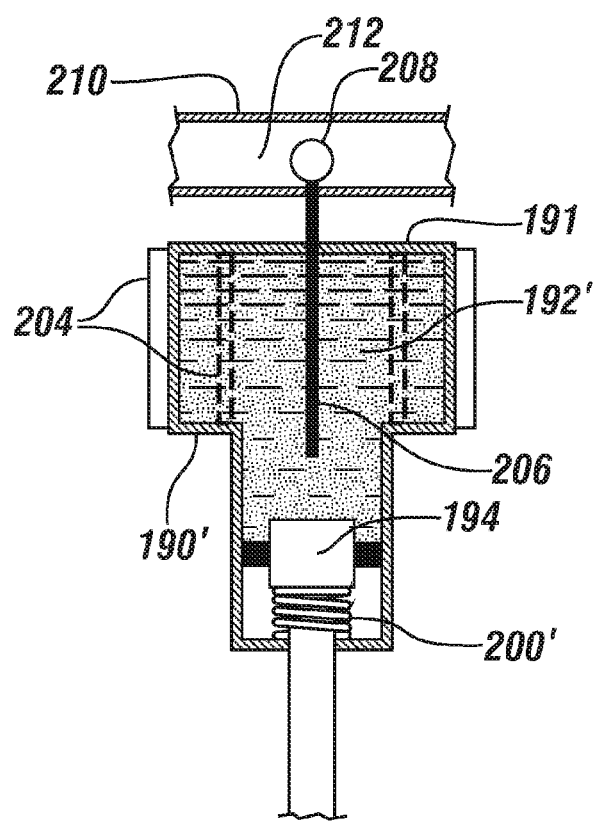
FIG. 8B shows an illustrative alternative paraffin actuator with the paraffin in its liquid form and actuation of the piston and includes a number of features to promote more rapid heating, more rapid cooling and greater stroke, not all of which would necessarily be present on a single operating actuator.

The paraffin is contained within an otherwise sealed container with a piston in a suitably close-fitting bore as shown in the representations shown in FIGS. 8A and 8B. FIG. 8A, which shows the simplest implementation of a paraffin actuator illustrates a hollow, cylindrical container, closed on one end 190, containing paraffin 192 of suitable melting point. The paraffin is confined by the container wall and by piston 194 with seals 196 which engage the interior walls of container 190 to prevent leakage of paraffin. Plunger 198, connected to piston 194, will advance as the paraffin melts. In this representation advance of piston 194 will be opposed by integral return spring 200 which seats on plunger 194 and the underside of cylinder lips 202. On re-solidification of the paraffin on cooling, return spring 200 will displace piston 194 to its starting position. The paraffin cylinder shown in FIG. 8A may be substituted for the SMA actuator of FIG. 5A and located in a similar range of positions.

The thermal conductivity of paraffin is appreciably less than that of SMA alloy. Also the required mass of paraffin is significantly greater than the mass of the SMA actuator of either FIG. 5A or FIG. 6A. Thus the transition from closed to open for a paraffin actuator will generally occur appreciably more slowly than for the SMA actuator. Some advantage may be obtained by embedding a heater within the paraffin volume but external heating will exacerbate the delay. For this reason it will probably be necessary to implement a different, more anticipatory, procedure for determining when to trigger such a device. Also, the undercooling which may be expected before the liquid transforms to a solid on cooling, coupled with the thermal inertia resulting from the appreciable paraffin volume required, may also influence the condition s under which heating is terminated. SMA actuators heated by an external heater such as is shown in FIG. 6B will likewise heat more slowly and may also require procedures which differ from those SMA actuators which employ Joule heating.

In FIG. 8B, the paraffin is shown melted with piston 194 displaced and return spring 200' compressed. This figure also illustrates some additional or optional features which may be incorporated in such an actuator, although not all features would necessarily be found in a single actuator as depicted. These features include external heating/cooling fins 204 and an internal post 206 extending through cylinder base 191 to protrude beyond cylinder 190'. Internal post 206, fabricated of a material with a suitably high thermal conductivity, is shown terminating in a larger feature 208 and is intended to convey heat to the interior core of the paraffin to enhance heat transfer. Such a configuration may enable sensing alternative elements of the brake system. For example, in illustration 8B, feature 208 is shown in the brake fluid 212 contained in brake line 210. Thus, in this configuration the paraffin actuator will respond primarily to the brake fluid temperature. A further difference between the container configuration shown in FIGS. 8A and 8B is that the container 190' of FIG. 8B is of non-uniform dimension and incorporates cooling fins 204 over a portion of its length. Such a configuration may be useful in efficiently packaging a larger volume of paraffin when a longer stroke is desired. It will be appreciated that only that portion of container 190' against which piston 194 seals need be cylindrical. Also the base 191 of container 190' may be shaped to enable improved thermal communication with the sensed region of the brake system. For example base 191 may be shaped with a recess shaped to at least partially accommodate brake line 210 to more effectively sense brake fluid temperature. If the actuator is to be positioned on the caliper support base 191 may be complementarily shaped to conform to the geometry of such caliper support.

An opening time duration of less than 5 seconds may be readily established for any SMA-based actuator using direct resistance heating of the SMA element. However SMA actuators which employ external heaters and paraffin actuators, whether externally heated or heated by embedded heaters internal to the paraffin volume may exhibit somewhat longer opening times.

The simplest controller procedure would be to trigger the actuator when the sensed brake temperature exceeds some predetermined temperature. Such a procedure may be suitable when the actuator response time is rapid, on the order of a few seconds or so, such as in a resistively-heated SMA actuator. But the brake temperature may be expected to continue to increase as the actuator is being deployed. So, slower-responding actuators, such as paraffin-based actuators or SMA actuators employing external heaters, may allow the brake temperature to exceed, possibly appreciably exceed, the predetermined temperature before the actuator fully opens the closure and provides cooling air to the brake system. For these actuators, it may be more appropriate to also determine the rate of temperature increase so that the instantaneous temperature and its rate of increase may be employed in combination to anticipate a future brake temperature. Knowing the time required to fully open the closure, the actuator may be triggered to open the closure so that the closure is fully open when the anticipated temperature will be substantially equal to the predetermined temperature. Further refinements, for example based on knowledge of ambient temperature and whether or not braking is currently underway may be incorporated to refine the estimate of anticipated temperatures.

Yet more sophisticated approaches may be contemplated. These may include history-based algorithms in which the controller 'remembers' a need for brake cooling during a previous trip and so anticipates a need on a subsequent trip. Another possibility is to couple the controller to a position-sensing device such as a GPS unit with maps so that entry of vehicle into a mountainous region will promote brake cooling. Similarly, supplementary brake cooling might be initiated for heavily-loaded or trailer-towing vehicles.

Practices of the invention have been described using certain illustrative examples, but the scope of the invention is not limited to such illustrative examples.

The invention claimed is:

1. A vehicle-mounted device for delivering cooling air, on demand, to a vehicle brake, the device comprising:
    a duct with an inlet, the inlet being positioned on a vehicle to access an air flow passing around a vehicle exterior, and the duct and inlet cooperating to transport air from the vehicle exterior of a forward-moving vehicle to one or more vehicle brakes;
    a closure located in the duct or inlet, the closure denying passage of cooling air in a closed position and allowing passage of cooling air in an open position; and
    a rotary actuator, comprising two, generally straight, linear shape memory alloy (SMA) elements, a fixed support and a pivotable body, the pivotable body being attached, at its center, to a shaft operably connected to the closure, each of the shape memory alloy elements being of like length and cross-section, and being adapted for Joule heating by passage of electric current along their lengths;
    the SMA elements having first and second ends, the first ends of each SMA element being attached to the fixed support and the second ends of each SMA element being attached to opposing connection points on the pivotable body so that alternately heating one of the SMA elements will contract the heated SMA element and rotate the body about its center, and stretch the unheated SMA element, so that alternately heating each of the SMA elements will transition the closure between its open and closed positions; and,
    the actuator further comprising at least one releasable mechanical retainer adapted to engage the pivotable body and so maintain the closure in each of its open or closed positions upon ceasing passage of current through the heated element, the releasable mechanical retainer being further adapted to disengage from the pivotable body to enable rotation of the pivotable body when the unheated SMA element is subsequently heated by passage of electric current and contracts.

2. The device recited in claim 1 in which the pivotable body is a disc and the second ends of each linear SMA element are attached to the circumferential perimeter of the disc substantially at opposing ends of a diameter of the disc.

3. The device recited in claim 2, in which the releasable mechanical retainer comprises two detents in the circumferential perimeter of the disc and a spring-actuated body, mounted external to the disc, positioned to engage the detents and prevent rotation of the disc to thereby retain the disc in positions corresponding to open and closed closure positions of the closure without continued heating of the one linear SMA element.

4. The device recited in claim 1 in which the closure comprises a plurality of independently configurable segments, each segment having an open and a closed position and each segment being independently maintained in its open or closed position by one of a like number of actuators, so that, by suitably configuring an appropriate number of segments, a range of airflows may be developed.

5. The vehicle-mounted device for delivering cooling air, on demand, to a vehicle brake as recited in claim 1, the device further comprising a controller adapted to pass electric current along the element lengths, the controller being adapted to ensure that the predetermined electric current is passed through not more than one of the shape memory alloy elements at any given time.

6. The vehicle-mounted device for delivering cooling air, on demand, to a vehicle brake as recited in claim 1 in which the rotary actuator is exposed to at least of a portion of the brake-directed cooling air to enable prompt cooling of an unpowered, previously-heated SMA element.

7. The device recited in claim 1 in which the linear SMA elements are in a martensite phase when in a first temperature range and in an austenite phase when in a second temperature range, higher than the first temperature range, so that passage of an electric current suitable for raising the temperature of one of the SMA wires from a temperature in its first temperature range to a temperature in its second temperature range transforms the SMA wire from its martensite phase to its austenite phase, the transformation resulting in contraction of the heated wire while generating a force sufficient to disengage the detent, rotate the disc and stretch the other, unheated, martensite-phase, SMA wire.

8. A device, mounted on a vehicle, for directing supplementary cooling air to a vehicle brake, the device comprising:
an inlet, constructed and adapted for placement in a vehicle with a wheel, a brake and a wheel well, the inlet being so placed as to receive a portion of an airflow resulting from the motion of the vehicle;
a duct with a length and extending from the inlet to the vehicle brake; the duct being connected at a first end to the inlet to convey the airflow portion received by the inlet and having at least one opening at a second end, the opening at the second end being positioned proximate to the vehicle brake so that the airflow portion received by the inlet and conveyed by the duct may be discharged into the wheel well and onto some portion of the vehicle brake and so provide supplementary cooling air to the brake;
a closure, located in the inlet or the duct, capable of preventing passage of the air flow portion in a closed position and of permitting passage of the air flow portion in an open position;
a temperature sensor adapted to sense temperatures indicative of a vehicle brake temperature, the sensor providing an electrical signal proportional to the sensed temperature, the sensor being connected to a controller; and
a rotary actuator comprising two linear, generally straight, shape memory alloy (SMA) operating elements each of which undergoes a heat-induced phase change, each SMA element being of like length and cross-section, the rotary actuator being operably connected to the closure and responsive to the controller, the controller being adapted for regulating passage of an electric current along substantially the length of each of the SMA elements for heating the SMA elements to induce the phase change and thereby operate the actuator, the controller being adapted to disable passage of current through both SMA elements, or enable passage of current though each of the first and second SMA elements individually, such that passing current through only the first element opens the closure to enable flow of the air flow portion to the brake and wheel well when the indicated brake temperature attains, or is anticipated to attain, a predetermined temperature and extends the second SMA element by a predetermined length for operation under a later heating step; and, passing current through only the second SMA element closes the closure to shut off flow of the air flow portion when the indicated brake temperature is less than the predetermined temperature and extends the first SMA element by a like predetermined length for operation under a later heating step; and
the rotary actuator incorporates mechanical retainers to maintain the actuator in either a first or a second configuration, corresponding to the open and closed positions of the closure, upon ceasing passage of current through the heated element.

9. The vehicle-mounted device for providing supplementary cooling air to a vehicle brake as recited in claim 8 in which the SMA element is one of the group consisting of a wire, a braid, a tape and a cable.

10. The vehicle-mounted device for providing supplementary cooling air to a vehicle brake as recited in claim 8 in which the composition of the SMA element comprises two or more of the elements of the group consisting of nickel, titanium, indium, aluminum, gallium, copper, zinc, gold, cadmium, manganese, iron, tin, silicon, palladium and platinum.

11. The vehicle-mounted device for providing supplementary cooling air to a vehicle brake as recited in claim 8 in which the temperature range at which the SMA element starts to undergo transformation on heating is between 80° C. and 100° C.

12. The vehicle-mounted device for providing supplementary cooling air to a vehicle brake as recited in claim 8 in which the inlet is positioned in the vehicle airflow at a location where the pressure of the airflow is greater than the pressure of the air in a vehicle wheel well.

13. The vehicle-mounted device for providing supplementary cooling air to a vehicle brake as recited in claim 8 in which the brake is a disc brake.

14. The vehicle-mounted device for providing supplementary cooling air to a vehicle brake as recited in claim 8 in which the brake is a drum brake.

15. The vehicle-mounted device for providing supplementary cooling air to a vehicle brake as recited in claim 8 in which the closure is one of the group consisting of a butterfly valve, a gate valve, a ball valve, a louver valve and an iris valve.

16. The vehicle-mounted device for providing supplementary cooling air to a vehicle brake as recited in claim 8 in which the closure comprises a plurality of independently configurable segments, each segment having an open and a closed position and each segment being independently maintained in its open or closed position by one of a like number of actuators, so that, by suitably configuring an appropriate number of segments, a range of airflows may be developed.

17. The vehicle-mounted device for providing supplementary cooling air to a vehicle brake as recited in claim 8 in which the duct and inlet have a combined length and the closure is placed so that the distance from the inlet to the closure is no more than 30% of the combined length.

18. The vehicle-mounted device for providing supplementary cooling air to a vehicle brake as recited in claim 8 in which the mechanical retainer comprises a third SMA element arranged and adapted to transition the mechanical retainer from an engaged state in which it maintains the actuator in either of its first or second configurations and a disengaged state in which the actuator may transition from its first configuration to its second configuration or vice versa.

19. A motor vehicle with a rotating brake system component coolable by inflowing air abstracted from the airflow surrounding the moving vehicle and conveyed to the brake system component through a closeable inlet and duct, the vehicle comprising:
    at least three wheels, each wheel supporting a tire, each wheel being mounted to the rotating component of a brake system, each wheel, tire and rotating brake system component being positioned in an individual wheel well in a vehicle body structure;
    the duct having a closeable inlet, the inlet being positioned on a vehicle to access an air flow passing around a vehicle exterior and resulting from forward motion of the vehicle, the duct and inlet cooperating to transport air through the duct from the vehicle exterior to a one or more wheel wells and vehicle brakes;
    a closure mounted on a rotatable shaft located in the duct or closable inlet, the closure denying passage of cooling air in a first, closed, position and allowing passage of cooling air in a second, open, position;
    a temperature sensor adapted to sense temperatures indicative of a vehicle brake temperature, the sensor providing an electrical signal proportional to the sensed temperature, the sensor being connected to a controller for operating a shape memory alloy actuator;
    the actuator comprising a first, closure-opening linear shape memory alloy (SMA) element and a second, closure-closing linear SMA element, the elements being substantially straight and of like dimension, the actuator further comprising a disc with a center, a diameter, and a perimeter, the elements and the disc being located in a generally common plane; the disc being attached, substantially at its center, to a rotatable actuator shaft connected to the closure shaft, the actuator shaft extending generally perpendicular to the common plane so that reversing rotation of the disc rotates the actuator shaft and repeatedly transitions the closure between its open and closed positions; each of the SMA elements having two ends, a cross-section, and a length, and each of the SMA elements being adapted for passage of a predetermined electric current substantially along its length from a first end to a second end; the disc further comprising two angularly spaced apart detents on the perimeter of the disc, the detents being engageable by a moveable body mounted external to the disc and shaped to engage the detents and prevent rotation of the disc when extended, and to disengage from the detent when retracted, the detents being so positioned and spaced apart that, when engaged by the moveable body, the detents enable the closure to adopt one of its first or second configurations;
    the actuator further comprising a fixed support; and
    a first end of each SMA element being connected to the fixed support and a second end of each SMA element being connected to substantially-opposing locations, symmetrically positioned with respect to the shaft, on the disc perimeter such that the heating of either linear shape memory alloy element, pre-extended to a pre-determined extent, shortens that element and rotates the disc to transition the closure from one position to the other position while extending the opposing element to a generally like pre-determined extent, the lengths and cross-sections of the elements and the diameter of the disc cooperating to extend the unheated shape memory alloy element and overcome the resistance to rotation afforded by the detent and its engageable body while rotating the shaft sufficiently to transition the closure between its open and closed positions and vice versa;
    the controller being adapted to regulate passage of electrical current for heating no more than one of the shape memory alloy elements at any time, the current being predetermined to heat the SMA element to at least its minimum operating temperature to operate the actuator; and
    the controller being further adapted to receive and interpret the temperature-indicating signal generated by the temperature sensor and to enable passage of the electric current in the closure-opening element when the sensed brake temperature exceeds, or is anticipated to exceed, a predetermined temperature, and to enable passage of the electric current in the closure-closing element when the sensed brake temperature is less than the predetermined temperature.

20. The motor vehicle with a rotating brake system component coolable by inflowing air abstracted from the airflow surrounding the moving vehicle as recited in claim 19 in which the linear SMA alloy elements are one of the group consisting of a wire, a braid, a tape, and a cable.

21. The motor vehicle with a rotating brake system component coolable by inflowing air abstracted from the airflow surrounding the moving vehicle as recited in claim 19 in which the composition of each of the SMA elements comprises two or more of the elements of the group consisting of nickel, titanium, indium, aluminum, gallium, copper, zinc, gold, cadmium, manganese, iron, tin, silicon, palladium and platinum.

22. The motor vehicle with a rotating brake system component coolable by inflowing air abstracted from the airflow surrounding the moving vehicle as recited in claim 19, in which the SMA elements starts to undergo transformation from a martensite phase to an austenite phase at a temperature of between 80° C. and 100° C.

23. The motor vehicle with a rotating brake system component coolable by inflowing air abstracted from the airflow surrounding the moving vehicle as recited in claim 19 in which the inlet is positioned in the vehicle airflow at a location where the pressure of the airflow is greater than the pressure of the air in the vehicle wheel well.

24. The motor vehicle with a rotating brake system component coolable by inflowing air abstracted from the airflow surrounding the moving vehicle as recited in claim 19 in which the rotating brake system component is a brake disc.

25. The motor vehicle with a rotating brake system component coolable by inflowing air abstracted from the airflow surrounding the moving vehicle as recited in claim 19 in which the closure is one of the group consisting of a butterfly valve, a ball valve, and a louver valve.

26. The motor vehicle with a rotating brake system component coolable by inflowing air abstracted from the airflow surrounding the moving vehicle as recited in claim 19 in which the closure may adopt additional positions, each additional position enabling passage of only some fraction of the airflow portion.

27. The motor vehicle with a rotating brake system component coolable by inflowing air abstracted from the airflow surrounding the moving vehicle as recited in claim 19 in which the controller periodically receives the brake temperature-indicating signal generated by the temperature sensor with a period of between 1 and 10 seconds during vehicle operation.

* * * * *